(12) United States Patent
Yamagata

(10) Patent No.: US 7,305,664 B2
(45) Date of Patent: Dec. 4, 2007

(54) APPARATUS, METHOD, SOFTWARE AND MEDIUM STORAGE FOR PERFORMING THE TASKS OF DETECTING SPECIFIED MARKS

(75) Inventor: Hideaki Yamagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 697 days.

(21) Appl. No.: 10/681,857

(22) Filed: Oct. 7, 2003

(65) Prior Publication Data

US 2004/0128656 A1    Jul. 1, 2004

(30) Foreign Application Priority Data

Oct. 9, 2002    (JP)    ............................. 2002-296673

(51) Int. Cl.
*G06K 9/32*    (2006.01)
(52) U.S. Cl. .................. 717/136; 382/293; 382/297
(58) Field of Classification Search ........ 382/135–138, 382/170–187, 151, 165, 215, 217, 229, 216, 382/231, 141–145, 105, 111, 112, 293, 209, 382/305

See application file for complete search history.

(56) References Cited

FOREIGN PATENT DOCUMENTS

| | | |
|---|---|---|
| EP | 651337 A1 * | 5/1995 |
| JP | 5-250475 | 9/1993 |
| JP | 6-163586 | 6/1994 |
| JP | 8-235359 | 9/1996 |
| JP | 9-147109 | 6/1997 |
| JP | 9-179982 | 7/1997 |
| JP | 11-110562 | 4/1999 |
| JP | 11-259657 | 9/1999 |
| JP | 2000-163586 | 6/2000 |
| JP | 2001-043365 | 2/2001 |
| JP | 2001-331805 | 11/2001 |

\* cited by examiner

*Primary Examiner*—Jingge Wu
*Assistant Examiner*—Jayesh A Patel
(74) *Attorney, Agent, or Firm*—Knoble Yoshida & Dunleavy, LLC

(57) ABSTRACT

A technique is disclosed to detect a specified mark that has been rotated by an unknown number of degrees. To make the detection efficient, the dictionary stores the specified marks in predetermined formats including the coordinate conversion table and the polar coordinate image. Furthermore, the coordinate conversion table includes the central distance D scale value indicative of a distance between a center of each of the pixels and a center of the dictionary image in the predetermined XY coordinate and the central rotation direction F scale value indicative of a degree of rotation of the dictionary image.

25 Claims, 22 Drawing Sheets

| No. | X | Y | r | θ |
|---|---|---|---|---|
| 0 | 19 | 20 | 0.71 | 0.785398 |
| 1 | 20 | 20 | 0.71 | 2.356194 |
| 2 | 20 | 19 | 0.71 | 3.926991 |
| 3 | 19 | 19 | 0.71 | 5.497787 |
| 4 | 18 | 20 | 1.58 | 0.321751 |
| 5 | 19 | 21 | 1.58 | 1.249046 |
| 6 | 20 | 21 | 1.58 | 1.892547 |
| 7 | 21 | 20 | 1.58 | 2.819842 |
| 8 | 21 | 19 | 1.58 | 3.463343 |
| 9 | 20 | 18 | 1.58 | 4.390638 |
| 10 | 19 | 18 | 1.58 | 5.034140 |
| 11 | 18 | 19 | 1.58 | 5.961435 |
| 12 | 18 | 21 | 2.12 | 0.785398 |
| 13 | 21 | 21 | 2.12 | 2.356194 |
| 14 | 21 | 18 | 2.12 | 3.926991 |
| 15 | 18 | 18 | 2.12 | 5.497787 |
| ⋮ | ⋮ | ⋮ | ⋮ | ⋮ |

Fig. 6

| No. | X | Y | D | r | θ |
|---|---|---|---|---|---|
| 0 | 19 | 20 | 0 | 0.71 | 0.785398 |
| 1 | 20 | 20 | 0 | 0.71 | 2.356194 |
| 2 | 20 | 19 | 0 | 0.71 | 3.926991 |
| 3 | 19 | 19 | 0 | 0.71 | 5.497787 |
| 4 | 18 | 20 | 1 | 1.58 | 0.321751 |
| 5 | 19 | 21 | 1 | 1.58 | 1.249046 |
| 6 | 20 | 21 | 1 | 1.58 | 1.892547 |
| 7 | 21 | 20 | 1 | 1.58 | 2.819842 |
| 8 | 21 | 19 | 1 | 1.58 | 3.463343 |
| 9 | 20 | 18 | 1 | 1.58 | 4.390638 |
| 10 | 19 | 18 | 1 | 1.58 | 5.034140 |
| 11 | 18 | 19 | 1 | 1.58 | 5.961435 |
| 12 | 18 | 21 | 2 | 2.12 | 0.785398 |
| 13 | 21 | 21 | 2 | 2.12 | 2.356194 |
| 14 | 21 | 18 | 2 | 2.12 | 3.926991 |
| 15 | 18 | 18 | 2 | 2.12 | 5.497787 |
| ⋮ | ⋮ | ⋮ | ⋮ | ⋮ | ⋮ |

Fig. 7

| No. | X | Y | D | r | F | θ |
|---|---|---|---|---|---|---|
| 0 | 19 | 20 | 0 | 0.71 | 24 | 0.785398 |
| 1 | 20 | 20 | 0 | 0.71 | 72 | 2.356194 |
| 2 | 20 | 19 | 0 | 0.71 | 120 | 3.926991 |
| 3 | 19 | 19 | 0 | 0.71 | 168 | 5.497787 |
| 4 | 18 | 20 | 1 | 1.58 | 10 | 0.321751 |
| 5 | 19 | 21 | 1 | 1.58 | 38 | 1.249046 |
| 6 | 20 | 21 | 1 | 1.58 | 58 | 1.892547 |
| 7 | 21 | 20 | 1 | 1.58 | 86 | 2.819842 |
| 8 | 21 | 19 | 1 | 1.58 | 106 | 3.463343 |
| 9 | 20 | 18 | 1 | 1.58 | 134 | 4.390638 |
| 10 | 19 | 18 | 1 | 1.58 | 154 | 5.034140 |
| 11 | 18 | 19 | 1 | 1.58 | 182 | 5.961435 |
| 12 | 18 | 21 | 2 | 2.12 | 24 | 0.785398 |
| 13 | 21 | 21 | 2 | 2.12 | 72 | 2.356194 |
| 14 | 21 | 18 | 2 | 2.12 | 120 | 3.926991 |
| 15 | 18 | 18 | 2 | 2.12 | 168 | 5.497787 |

Fig. 14

| No. | X | Y | D | r | F | θ |
|---|---|---|---|---|---|---|
| 0 | 19 | 20 | 0 | 0.71 | 24 | 0.785398 |
| 1 | 20 | 20 | 0 | 0.71 | 72 | 2.356194 |
| 2 | 20 | 19 | 0 | 0.71 | 120 | 3.926991 |
| 3 | 19 | 19 | 0 | 0.71 | 168 | 5.497787 |
| 4 | 18 | 20 | 0 | 1.58 | 10 | 0.321751 |
| 5 | 19 | 21 | 0 | 1.58 | 38 | 1.249046 |
| 6 | 20 | 21 | 0 | 1.58 | 58 | 1.892547 |
| 7 | 21 | 20 | 0 | 1.58 | 86 | 2.819842 |
| 8 | 21 | 19 | 0 | 1.58 | 106 | 3.463343 |
| 9 | 20 | 18 | 0 | 1.58 | 134 | 4.390638 |
| 10 | 19 | 18 | 0 | 1.58 | 154 | 5.034140 |
| 11 | 18 | 19 | 0 | 1.58 | 182 | 5.961435 |
| 12 | 18 | 21 | 1 | 2.12 | 24 | 0.785398 |
| 13 | 21 | 21 | 1 | 2.12 | 72 | 2.356194 |
| 14 | 21 | 18 | 1 | 2.12 | 120 | 3.926991 |
| 15 | 18 | 18 | 1 | 2.12 | 168 | 5.497787 |
| ⋮ | ⋮ | ⋮ | ⋮ | ⋮ | ⋮ | ⋮ |

Fig. 20

| No. | X | Y | D | r | F | θ |
|---|---|---|---|---|---|---|
| 0 | 19 | 20 | 0 | 0.71 | 4 | 0.785398 |
| 1 | 20 | 20 | 0 | 0.71 | 48 | 2.356194 |
| 2 | 20 | 19 | 0 | 0.71 | 96 | 3.926991 |
| 3 | 19 | 19 | 0 | 0.71 | 144 | 5.497787 |
| 4 | 18 | 20 | 1 | 1.58 | 0 | 0.321751 |
| 5 | 19 | 21 | 1 | 1.58 | 28 | 1.249046 |
| 6 | 20 | 21 | 1 | 1.58 | 48 | 1.892547 |
| 7 | 21 | 20 | 1 | 1.58 | 76 | 2.819842 |
| 8 | 21 | 19 | 1 | 1.58 | 96 | 3.463343 |
| 9 | 20 | 18 | 1 | 1.58 | 124 | 4.390638 |
| 10 | 19 | 18 | 1 | 1.58 | 144 | 5.034140 |
| 11 | 18 | 19 | 1 | 1.58 | 172 | 5.961435 |
| 12 | 18 | 21 | 2 | 2.12 | 0 | 0.785398 |
| 13 | 21 | 21 | 2 | 2.12 | 48 | 2.356194 |
| 14 | 21 | 18 | 2 | 2.12 | 96 | 3.926991 |
| 15 | 18 | 18 | 2 | 2.12 | 144 | 5.497787 |
| ⋮ | ⋮ | ⋮ | ⋮ | ⋮ | ⋮ | ⋮ |

APPARATUS, METHOD, SOFTWARE AND MEDIUM STORAGE FOR PERFORMING THE TASKS OF DETECTING SPECIFIED MARKS

FIELD OF THE INVENTION

The current invention is generally related to a device, a software program and a storage medium of the software program for recognizing a predetermined mark, and more particularly related to generating a dictionary for the mark recognition and recognizing the predetermined mark that has been rotated by an unknown amount.

BACKGROUND OF THE INVENTION

It has been known that the simplest method of detecting an image portion that has been rotated by an unknown amount of degrees (a rotated image) is based upon matching the rotated input image and a plurality of predetermined rotated templates. However, the above described method requires that rotated images degrees are prepared over 360 in the dictionary and the memory storage space is substantial for the dictionary. To reduce the memory storage requirement, the templates are prepared for a total of 90 degrees in stead of 360 degrees, but the detection is performed over the 360-degree areas.

A first prior art reference, Japanese Patent Publication Hei 11-259657 is entitled as "Image Detection Device, Method and Storage Medium." The publication proposes a matching method of input image data converted in angular coordinates and the stored image data. A specified image has a constant angle after the image is converted into the angular coordinates. The above is true even if the image initially has an unknown angle. Based upon the above characteristics, a single set of image data is stored with respect to a standard object in stead of 360 degrees of the rotated image data.

A second prior art reference, Japanese Patent Publication Hei 2000-163586 is entitled as "Mark Recognition Device." The publication discloses that a circular object including the chiseled seal mark is scanned, and the center of the circular object is determined in the image data. The digital image is generated by emphasizing the edge portions of the seal mark. Subsequently, the seal mark image is generated by converting the above generated edge digital image into polar coordinates with respect to the detected center. For each direction of the edge lines, the frequency distribution is extracted as a power spectrum or a characteristic value. The extracted characteristic value is compared to the already stored seal mark characteristic values or templates, and the seal marks that have been chiseled on the engine valve or on a circular metallic surface such as a coin are thus recognized.

As described above, the recognition process is performed corresponding to an arbitrarily rotated angle along the circumference. Even if there are various noises, the recognition process is performed at a high precision level without being influenced by the noises. Furthermore, since the recognition process does not include the calculation intensive process, the recognition process is performed at a sufficiently high speed.

A third prior art reference, Japanese Patent Publication Hei 6-274736 is entitled as "Currency Recognition Device." The surface pattern is scanned from the currency, and the center of the currency portion is detected from the two-dimensional image data. About the currency center, the two-dimensional image is converted into polar coordinates. Furthermore, the frequency distribution of the image data along the circumferential directions is orthogonally converted to obtain a characteristic value or a power spectrum. For example to determine a currency type, the obtained characteristic value is compared to the already stored templates of characteristic values indicative of the front and back surfaces of the various currencies. In the above described method, it is necessary to prepare only the templates of the characteristic values indicative of the front and back surfaces of the various currencies. Even if the size and the material are substantially identical, the currency type is recognized with certainty without correcting the rotational angle.

A fourth prior art reference, Japanese Patent Publication 2001-43365 is entitled as "Still Image Characteristic Extraction Method." The orthogonal coordinate data of the digital information and the texture information are extracted from a given object in the still image. Assuming a circle circumscribing the object, in the coordinate whose origin is the center of the circle, a predetermined number is re-sampled from 0 to $2\pi$ in the radial direction of the circle from the origin so as to convert the orthogonal coordinate data into the polar coordinate data. From the polar coordinate data, the characteristic value is determined for the object. The characteristic value is independent of the object size or the object rotation. In other words, the characteristic value facilitates the matching process without performing the calculation related to rotation.

A fifth prior art reference, Japanese Patent Publication Hei 9-147109 is entitled as "Method and Device for Detecting Predetermined Mark." To detect a specified mark in an image, a radial polynomial table is prepared in advance based upon the size of the specified mark. In the process of detecting the specified mark, the radial polynomial table is modified based upon the reduction/expansion ratio of the image. The Zennike Moment is determined by the sum of products between the image and the modified radial polynomial table. The above described method allows the fast and precise detection of a specified mark at an arbitrary position, an arbitrary angle and an arbitrary scale.

A sixth prior art reference, Japanese Patent Publication Hei 9-179982 is entitled as "Predetermined Mark Detection Method." In detecting a specified pattern using the rotationally independent multidimensional characteristic value, the characteristic value at each dimension must be rotationally independent, and the characteristic value must be determined based upon the central angle. By changing a standard for the central angle determination for each dimension, the image information is minimally lost, and the image is detected or recognized at a high precision level.

On the other hand, the following method is known to detect a circular specified image in an input image. A seventh prior art reference, Japanese Patent Publication Hei 11-110562 is entitled as "Pattern Recognition Method, Device and Recording Medium." The presence of edges is determined from multiple positions towards the center of the input image. When the edge has been detected from multiple positions, it is determined that an image having an outer circular shape is detected in the input image.

Furthermore, a eighth prior art reference, Japanese Patent Publication 2001-31805 is entitled as "Upper Semi Circular Image Detection Method." In the input image, a pattern is searched to match initial search conditions. It is determined based upon the dictionary whether or not the distance between the middle point to either a right or left edge is within the prescribed distance from an upper edge in a sub-scanning direction in the searched pattern. If the number of lines beyond the prescribed distance is below a predetermined threshold value and the search reaches a predetermined radius value, proper detection is accomplished despite an improper position due to an edge loss or noise by assuming that a semicircle is detected.

Another image pattern matching method includes the following ninth prior art, Japanese Patent Publication Hei 5-250475, entitled as "Pattern Matching Method." After the position of the standard digital image pattern is corrected to coincide at a target pattern, unmatched pixels between the standard and target patterns are extracted. The sum of the products is determined by multiplying the extracted pixels by coefficients proportionally indicative of the characteristics of the standard pattern. The above obtained sum is used to determine the amount of match. The above described method provides an accurate evaluation on the match level between the target and standard patterns.

Despite the above described prior art techniques, there remain undesirable features. For example, the first prior art technique requires that as it gets closer to the central portion in an original image, the polar coordinate converted image is more stretched. The amount of information for a unit area is less as it gets closer to the center coordinates. For example, four pixels around the central coordinate in the perpendicular coordinate system are interpolated and stretched over 360 degrees in the polar coordinate system. However, as you get farther away from the central coordinate, since the number of pixels increases at the equidistance from the central coordinate, the amount of information differs between the near-circumferential area and the near-central area. For this reason, when a simple comparison is made among polar coordinate images, a false determination is likely to occur within small radial regions due to errors. To reduce the false determination, at least a normalization process is necessary.

In the second, third and four prior art references, since the polar coordinate image is further compressed into a characteristic value, the precision is lower than the straight comparison of the images. From the point of preventing a false detection, the comparison of the characteristic value is not desirable.

In the fifth and sixth prior art references, if the information such as a number of dimensions is increased to obtain the same level of functionality as the matching of the unprocessed images, it is not common that the dictionary needs to hold more information than the templates over 360 degrees.

The seventh and eighth prior art references illustrate exemplary techniques of determining a matching position for extracting an image. Although the ninth and tenth prior art references is related to a technique of extracting a predetermined pattern, neither of the prior art references is related to a technique of handing a rotated image.

In view of the above issues, there remains some improvement in detecting a predetermined mark with an unknown amount of rotation in an input image. The improvement lies in a limited size of the template or dictionary and a limited number of false detections. The improvements are implemented in a mark detection dictionary generation device, a mark detection device, a mark recognition device, a software program to perform the functions of the above devices or a computer-readable storage medium for storing the software program instructions.

SUMMARY OF THE INVENTION

In order to solve the above and other problems, according to a first aspect of the current invention, a method of generating a dictionary for detecting a specified mark, including the steps of: inputting a dictionary image; generating a coordinate conversion table containing a list of corresponding coordinates between a predetermined XY coordinate and a predetermined polar coordinate for converting the inputted dictionary image into polar coordinates, the polar coordinates being expressed by a central distance to a predetermined center and a central angle the coordinate conversion table further including a pair of F and D values corresponding to the XY coordinate, the F value being an integer by counting fractions equal to or over 0.5 as defined in an equation $F = \theta/U$, where $U=2\pi/\Theta$, the $\theta$ being the central angle in the polar coordinates, the $\Theta$ being a number of pixels in a $\theta$ direction, the D value being assigned an integer from 0 to a predetermined number for the central distance in the polar coordinates; generating a polar coordinate image for the dictionary from the dictionary image based upon the coordinate conversion table; storing the coordinate conversion table and the polar coordinate image in the dictionary; rotating to reconstruct an image based upon the upon the coordinate conversion table; and comparing the reconstructed image and specified mark candidates to determine the specified mark to identify a match.

According to a second aspect of the current invention, a storage medium for storing a computer program containing instructions for generating a dictionary and for detecting a specified mark, the instructions including the tasks of: inputting a dictionary image: generating a coordinate conversion table containing a list of corresponding coordinates between a predetermined XY coordinate and a predetermined polar coordinate for converting the inputted dictionary image into polar coordinates, the polar coordinates being expressed by a central distance to a predermined center and a central angle, the coordinate conveision table further including a pair of F and D values corresponding to the XY coordinate, the F value being an integer counting fractions equal to or over 0.5 as defined in an equation $F = \theta/U$, where $= 2\pi/\Theta$, the $\theta$ being the central angle in the polar coordinates, the $\Theta$ being the number of pixels in a $\theta$ direction, the D value being assigned to integer from 0 to a predetermined number for the dictionary from the dictionary image based upon the coordinate conversion table; storing the coordinate conversion table and the polar coordinate image in the dictionary; rotating to reconstruct an image based upon the coordinate conversion table; comparing the reconstructed image and specified mark candidates to determine the specified mark to identify a match.

According to a third aspect of the current invention, an apparatus for generating a dictionary for detecting a specified mark, including: a dictionary generation image input unit for inputting a dictionary image; a coordinate conversion table generation unit for generating a coordinate conversion table containing a list of corresponding coordinates between a predetermined XY coordinate and a predetermined polar coordinate for converting the inputted dictionary image into polar coordinates, the polar coordinates being expressed by a central distance to a predetermined center and a central angle, the coordinate conversion table further including a pair of F and D values corresponding to the XY coordinate, the F value being an integer by counting fractions equal to or over 0.5 as defined in an equation $F. = \ominus/U$, where $U=2\pi/\Theta$, the $\ominus$ being the central angle in the polar coordinates, the $\Theta$ being a number of pixels in a $\Theta$ direction, the D value being assigned an interger from 0 to a predetermined number for the central distance in the polar coordinates: a polar coordinate generation unit connected to the dictionary generation image input unit and the coordinate conversion table generation unit for generating a polar coordinate image for the dictionary from the dictionary image based upon the coordinate conversion table; a dictionary connected to the polar coordinate generation unit for storing the coordinate conversion table and the polar coordinate image; an image input unit for inputting an image; a mark candidate extraction unit connected to the image input unit for extracting specified mark candidates from the inputted image; and a matching unit connected to the dictionary and the mark candidate extraction unit for rotating to reconstruct an image based upon the coordinate conversion table, the matching unit comparing the reconstructed image and the specified mark candidates to determine a specified mark to identify a match.

According to a fourth aspect of the current invention, an apparatus for generating a dictionary for detecting a specified mark, including: a dictionary generation image input unit for inputting a specified mark image; a polar coordinate generation unit connected to the dictionary generation image input unit for generating a polar coordinate image from the specified mark image based upon a predetermined coordinate conversion table, the specified mark in a polar coordinate image being expressed by a central distance to a predetermined center and a central angle, the coordinate conversion table further including a pair of F and D values corresponding to the XY coordinate, the F value being an integer by counting fractions equal to or over 0.5 as defined in an equation F=⊖/U, where U=2π/Θ, the ⊖being the central angle in the polar coordinates, the Θ being a number of pixels in a ⊖ direction, the D value being assigned an integer from 0 to a predetermined number for the central distance in the polar coordinates; a dictionary unit connected to the polar coordinate generation unit for storing the polar coordinate image; and a matching unit connected to the dictionary unit for rotating the polar coordinate mage based upon the coordinate conversion table to reconstruct a rotated reconstructed polar coordinate image, the matching unit comparing the rotated reconstructed polar coordinate image and specified mark candidates to determine the specified mark to identify a match.

According to a fifth aspect of the current invention, an apparatus for generating a dictionary for detecting a specified mark, including: a dictionary heneration image input unit for inputting a specified mark image; a polar coordinate generation unit connected to the dictionary generation image input unit for generating a polar coordinate image from the specified mark image based upon a predetermined coordinate conversion table, the specified mark in a polar coordinate image being expressed by a central distance to a predetermined center and a central angle, the coordinate conversion table further including a pair of F and D values corresponding to the XY coordinate, the F value being an integer by counting factions equal to or over 0.5 as defined in an equation F=⊖/U, where U=2π/Θ, the Θ being the central angle in the polar coordinates, the Θbeing a number of pixels in a ⊖ direction, the D value being assigned an integer from 0 to a predetermined number for the central distance in the polar coordinates; a dictionary unit connected to the polar coordinate generation unit for storing the polar coordinate image; and a matching unit connected to the dictionary unit for rotating the polar coordinates image based upon the coordinate conversion table to reconstruct a rotated reconstructed polar coordinate image, the matching unit comparing pixels in the rotated reconstructed polar coordinate image and corresponding pixels in specified mark candidates to determine the specified mark to identify a match.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a table illustrating the assignment of a common D scale value for the same distance r in the above exemplary coordinate conversion table.

FIG. 7 is table illustrating the assignment of a common F scale value in the above exemplary coordinate conversion table.

FIG. 14 is a table illustrating an exemplary coordinate conversion table values with the D and F scale values whose D values have been clustered in the coordinate conversion table of FIG. 7.

FIG. 20 is a table illustrating exemplary coordinate conversion table values that have been generated by the above preferred process as described with respect to FIG. 19.

DETAILED DESCRIPTION OF THE PREFERRED EMBODIMENT(S)

Based upon incorporation by external reference, the current application incorporates all disclosures in the corresponding foreign priority document from which the current application claims priority.

Figure 1:
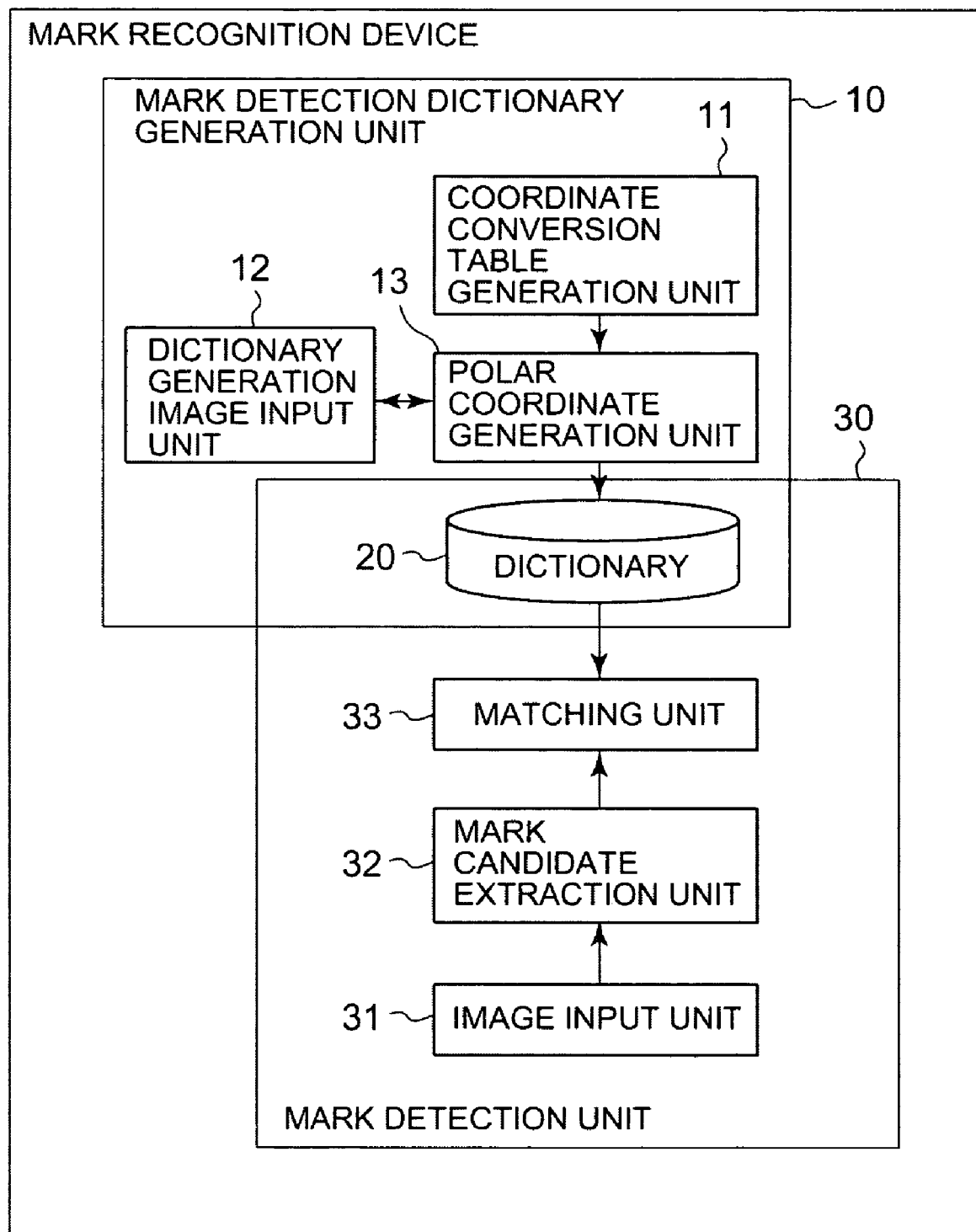
FIG. 1 is a block diagram illustrating one preferred embodiment of the mark recognition device according to the current invention.

Referring now to the drawings, wherein like reference numerals designate corresponding structures throughout the views, and referring in particular to FIG. 1, a block diagram illustrates one preferred embodiment of the mark recognition device according to the current invention. The referred embodiment includes a mark detection dictionary generation unit 10 and a mark detection unit 30. The mark detection dictionary generation unit 10 further includes a coordinate conversion table generation unit 11, a dictionary generation image input unit 12, a polar coordinate image generation unit 13 and a dictionary 20. The mark detection unit 30 further includes an image input unit 31, a mark candidate extraction unit 32, a matching unit 33 and the dictionary 20. The mark detection unit 30 refers to the dictionary 20 to determine whether the input image is a specified mark.

Figure 2A:
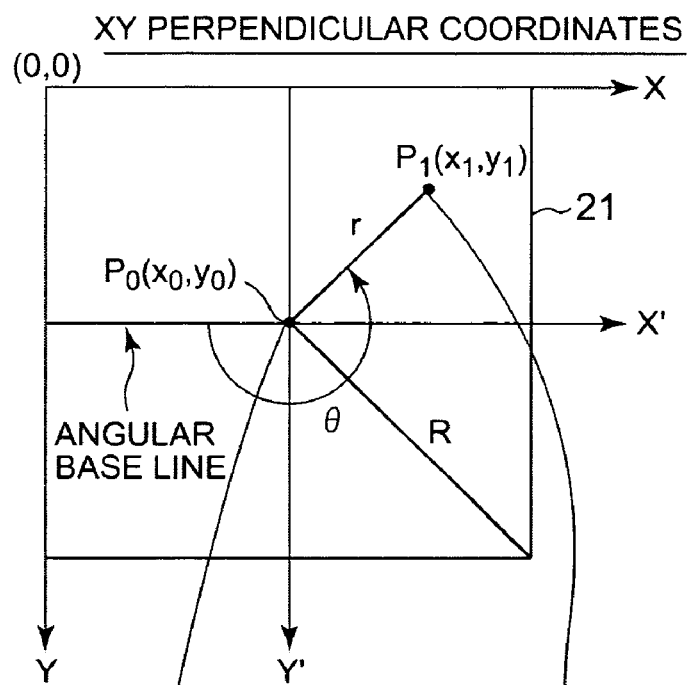
FIGS. 2A and 2B are graphs showing a positional relation between a point on the XY perpendicular coordinate system and a point on the r θ polar coordinate system.
Figure 2B:
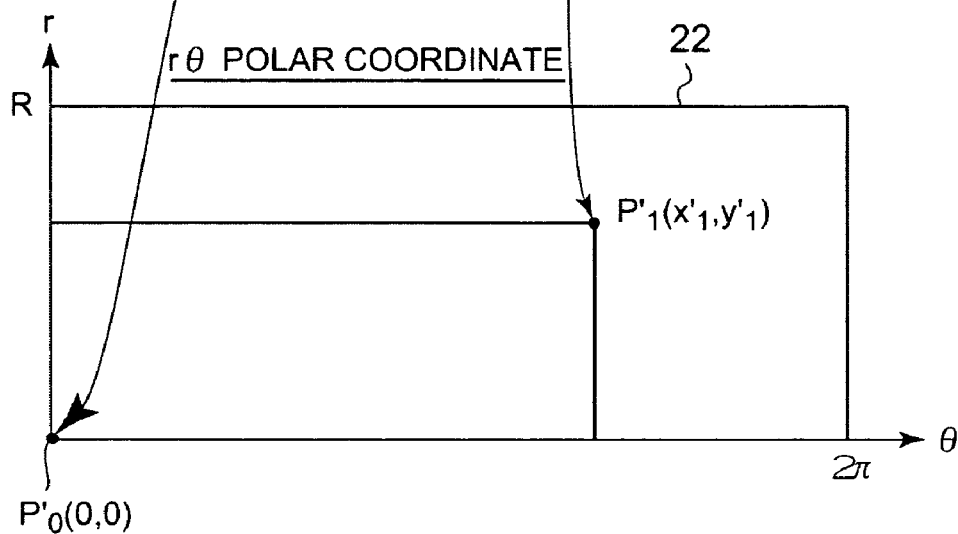

Now referring to FIGS. 2A and 2B, graphs show a positional relation between a point on the XY perpendicular coordinate system and a point on the r θ polar coordinate system. Referring to FIG. 2A, the pixel position on the XY perpendicular coordinate system is expressed by the origin at the upper left corner, the X-axis or main scanning direction towards the right and the Y-axis or sub scanning direction towards the bottom. An image 21 is a square whose diagonal distance is 2R from the origin.

Now referring to FIG. 2B, the image 22 has been converted from the XY perpendicular coordinate to the r θ polar coordinate system. The angle axis θ ranges from 0 to 2π or 360 degrees while the distance r ranges form 0 to R. The central coordinate $P_0$ $(x_0, y_0)$ of the image 21 before the polar coordinate conversion corresponds to a standard point $P'_0$ (0, 0) of the rectangular image 22 after the polar coordinate conversion. Furthermore, a point $P_1$ $(x_1, y_1)$ has a length r from the central coordinate $P_0$ $(x_0, y_0)$ of the image and an angle θ in the XY perpendicular coordinate system 21 before the polar coordinate conversion. The point $P_1$ $(x_1, y_1)$ will be converted into a point $P'_1$ $(x'_1, y'_1)$ on the r θ polar coordinate system by the following equations:

$$x'_1 = x_1 - r \cos \theta$$

$$y'_1 = y_1 - r \sin \theta$$

where the angle θ is formed by a line X' (herein after the angular standard or base line) passing a point $P_0$ that is parallel to the x axis and a line between points $P_0$ and $P_1$.

First Preferred Embodiment

The mark detection dictionary generation unit 10 of a first preferred embodiment will be described. In the following description, the dictionary generation image is assumed to be 40×40 pixels in a square in the XY perpendicular coordinate system. The coordinate conversion table generation unit 11 generates a table that indicates the correspondence between the pixels of the dictionary generation image in the XY perpendicular coordinate and the r θ polar coordinate. The coordinate conversion table generation unit 11 subsequently writes the above generated table in the dictionary 20.

Figure 3:
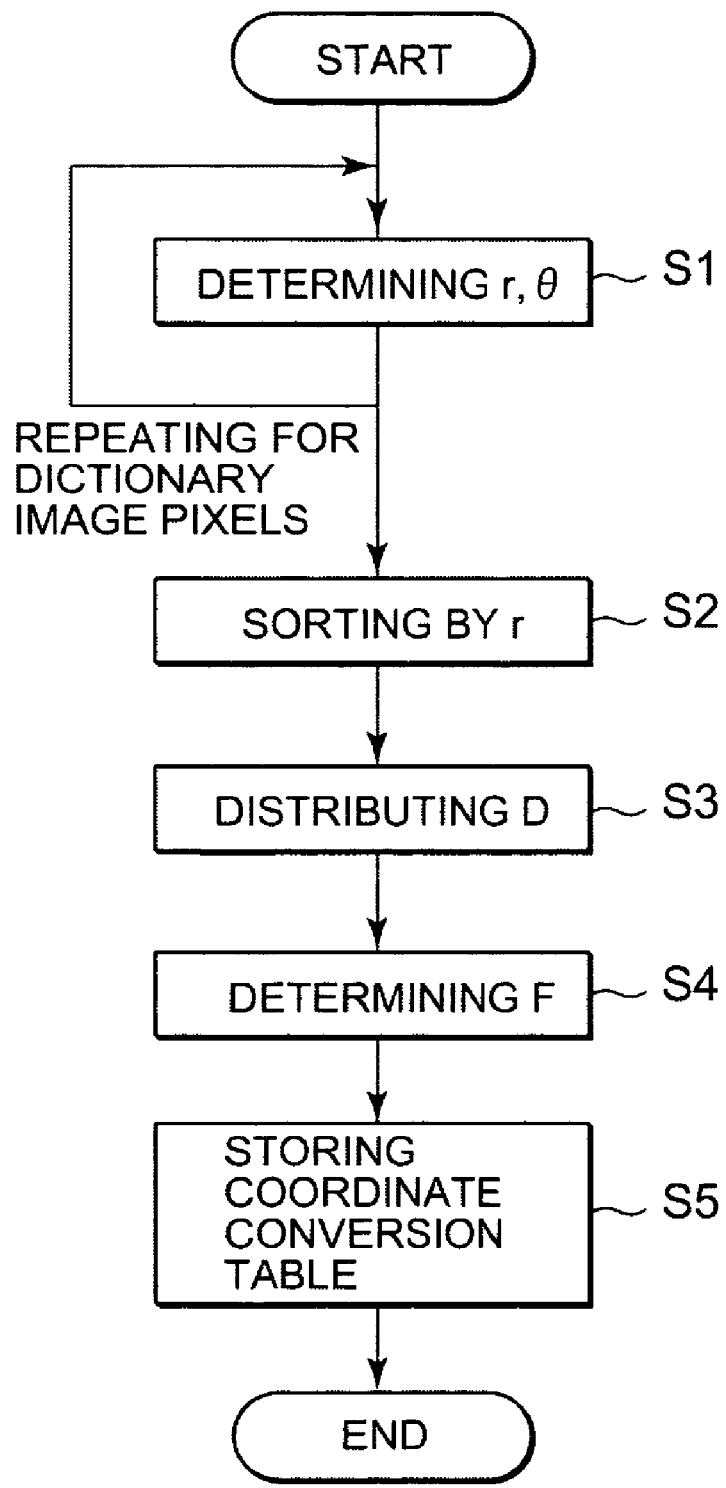
FIG. 3 is a flow chart illustrating steps involved in a preferred process that is performed by the coordinate conversion table generation unit 11 according to the current invention.

Now referring to FIG. 3, a flow chart illustrates steps involved in a preferred process that is performed by the coordinate conversion table generation unit 11 according to the current invention. In a step S1, a list is generated for the angle θ and the distance r that correspond to the coordinate (x, y) on the XY perpendicular coordinate. The distance r is from the center and the rotated angle θ is formed between the standard line X' and the distance r. Since each pixel is not a point, the angle and the distance are determined with respect to the central coordinate $P_0$ and the center of gravity of the pixel as illustrated in FIG. 4.

Figures 4, 5:
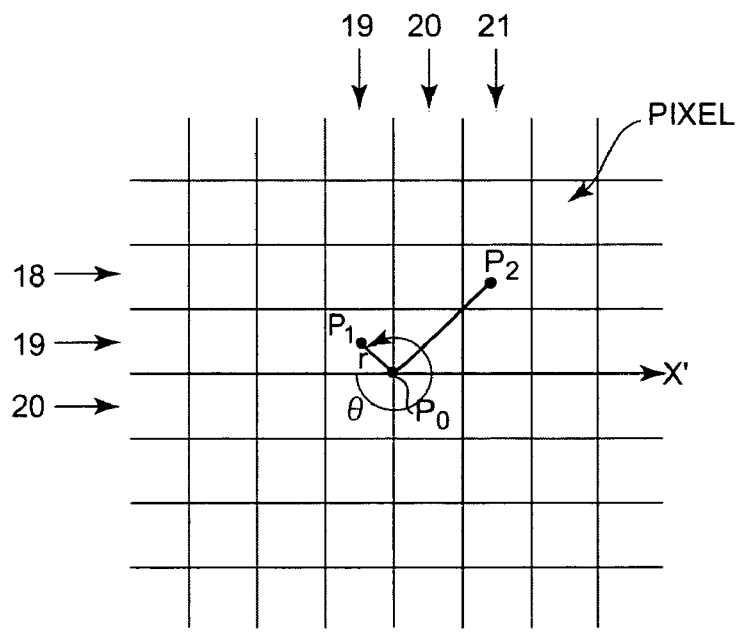
FIG. 4 is an exemplary determination of the angular coordinates in the distance r and the angle θ for the pixel (x, y) in the XY coordinate system.
FIG. 5 is a table illustrating an exemplary coordinate conversion table for converting between the XY coordinate (x, y) and the polar coordinate (r, θ).

FIG. 4 is an exemplary determination of the angular coordinates. The point $P_1$ (19, 19) on the XY perpendicular coordinate has:

$$r = 0.5 \times \sqrt{2} \approx 0.71$$

$$\theta = 315° = 7\pi/4 \approx 5.497787$$

Similarly, $P_2$ (21, 18) has:

$$r = 1.5 \times \sqrt{4} \approx 2.12$$

$$\theta = 225 = 5\pi/4 \approx 3.926991$$

As described above, the coordinate values are determined as illustrated in a table of FIG. 5. The exemplary data shows the correspondence between the XY coordinate values and the r θ coordinate values for all listed pixels.

Referring back to FIG. 3 assuming that the distance r is a first key and the angle θ is a second key, the data in the table is sorted in an ascending order in a step S2 of the flow chart. In a step S3 of the flow chart, according to the sorted table in the order of the distance r, a scale D is assigned from 0, 1, 2, 3 to a predetermined number based upon the r coordinate value. As shown in FIG. 6, the scale D is not equidistant since the scale D is made in the polar coordinate image along the central distance direction.

R=0.71, 1.58, 2.12, . . . .

A scale F for the angle θ of the pixel in the r θ polar coordinate system is determined in accordance with the polar coordinate image size based upon the following equation in a step S4 of the flow chart in FIG. 3.

The polar coordinate image size is N×Θ, where the number of pixels N is in the r direction and the number of pixels Θ is in the θ direction.

$$U=2\pi/\Theta$$

$$F=\theta/U$$

The scale F is an integer by counting fractions equal to or over ½ as one and disregarding the rest. The scale F is equidistant as in F=U, 2U, 3U, . . . . For example, the number of pixels Θ in the θ direction is selected to be a natural number so that U becomes a central angle formed by the adjacent pixels located farther away from the central coordinate. In the current example, the Θ value is 192.

Figure 8A:
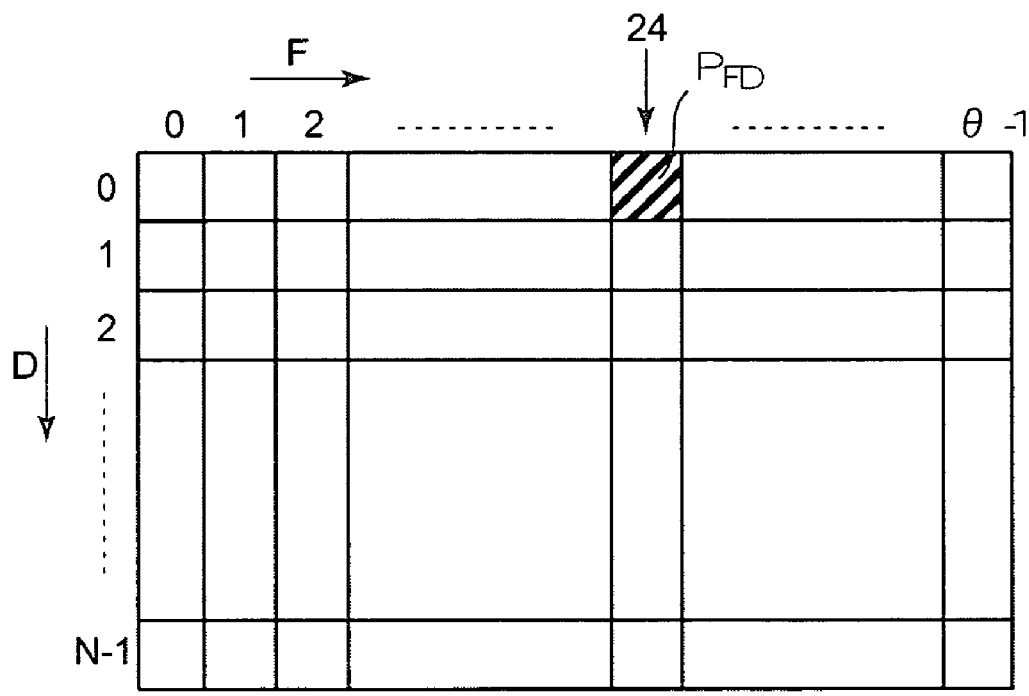
FIG. 8A is a graph illustrating an exemplary coordinate based upon the F and D scale values.
Figure 8B:
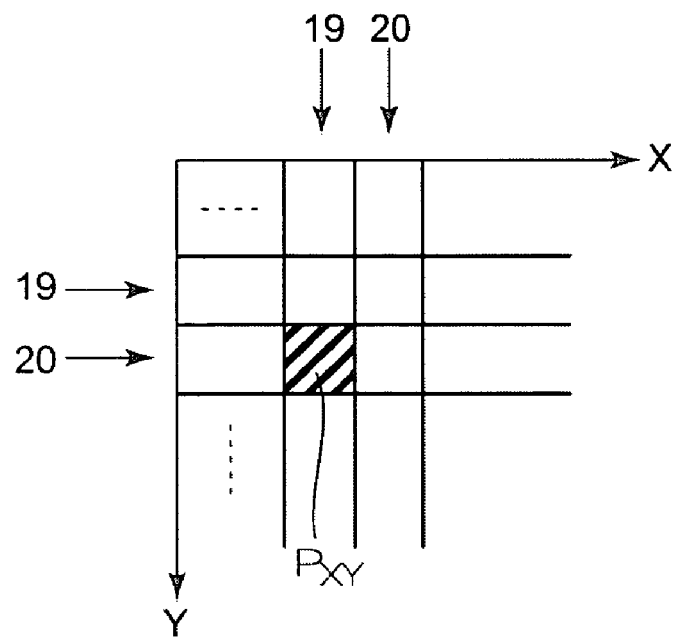
FIG. 8B is a graph illustrating an exemplary coordinate based upon the XY values.

As shown in FIG. 7, if Θ=192, the F values are calculated in the coordinate conversion table. A pixel $P_{xy}$ in the XY perpendicular coordinate system is converted in a pixel $P_{FD}$ in the the r θ coordinate system based upon the coordinate conversion table in FIG. 7. The above conversion is reversible as shown in FIGS. 8. For example, the pixel $P_{xy}$ (19, 20) is converted into the pixel $P_{FD}$ (24, 0) in the polar coordinate. The generated conversion table is stored in the dictionary 20 in the step S5 of the flow chart in FIG. 3. In the generated coordinate conversion table, sets of the X coordinate, the Y coordinate, the D scale and the F scale are sorted in the dictionary 20 for the number of the pixels in the r direction. For example, if the pixels are 40×40 in an image, the total number is 1600 sets in the dictionary 20. The preferred process this terminates.

The dictionary generation image input unit 12 reads an image for the dictionary generation in one of the following manners:

1) reading the image by a scanner,
2) reading the image already stored in a disk device, or
3) reading the image via a network.

It is also assumed that the image for generating the dictionary has the same predetermined size as the image to be searched. In the above example, the predetermined size is 40×40 pixels.

The polar coordinate image generation unit 13 reads the image for the dictionary generation via the dictionary generation image input unit 12 and generates a polar coordinate converted image. The polar coordinate image generation unit 13 stores the polar coordinate image in the dictionary unit 20. The polar coordinate image is a rectangular image raging within the D scale and the F scale of the above described polar coordinate conversion table. In the above example, the D scale ranges from 0 to 166 and N=167 while the F scale ranges from 0 to 191 and Θ=192.

Figure 9:
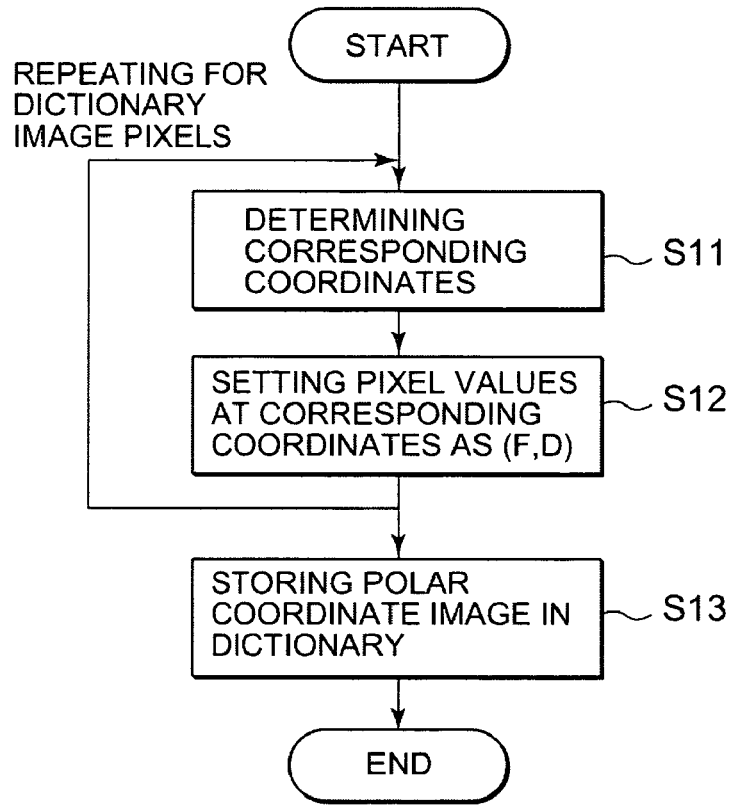
FIG. 9 is a flow chart illustrating steps involved in a preferred process that is performed by the polar coordinate image generation unit 13 according to the current invention.

Now referring to FIG. 9, a flow chart illustrates steps involved in a preferred process that is performed by the polar coordinate image generation unit 13 according to the current invention. In a step S11, the pixel coordinate (x, y) of the inputted specified mark image is determined in accordance with the coordinate (F, D) of the polar coordinate image. The coordinate (x, y) is determined by the following equations if the central coordinate of the inputted specified mark image is expressed by $(x_0, y_0)$.

$$x=x_0-r \cos \theta$$

$$y=y_0-r \sin \theta$$

$$\theta=FU=2\pi F/\Theta$$

The r value is determined from the corresponding r value when the D scale value is calculated for the coordinate conversion table. Next, the pixel value at the above obtained coordinate (x, y) in the inputted image is assigned to the pixel value at the coordinate (F, D) in a step S12. However, since the coordinate (x, y) is not necessarily an integer, the pixel value is determined using adjacent pixels and by an interpolation process. These calculations are repeatedly performed for every pixel at the coordinate (F, D) in the rectangle. The calculated polar coordinate image is stored in the dictionary 20 in a step S13. The preferred process the terminates itself.

Figure 10:
FIG. 10 is illustrated a specified mark image using Kanji characters in the Japanese language.
Figure 11:
FIG. 11 is an exemplary polar image from the above example as shown in FIG. 10.

Now referring to FIGS. 10 and 11, the above described process is further illustrated on an exemplary mark. An exemplary mark as shown in FIG. 10 has undergone the above described process. The image of the characters, "RCOH" as indicated by the XY directions has been processed according to the above described process to be converted to a polar coordinate image. The polar coordinate image is shown in FIG. 11 as indicated by the FD directions. The dictionary 20 stores the above polar coordinate image and the polar conversion table for each of the specified mark to be searched.

The mark detection unit 30 further includes the image input unit 31, the mark candidate extraction unit 32 for extracting mark candidates from the inputted image, the dictionary 20 that has been generated by the mark detection dictionary generation unit 10, and the matching unit 33 for matching the extracted matching candidates and the specified mark image stored in the dictionary 20. The image input unit 31 reads images from other computers via a network, a scanner or a storage device containing an image to be searched. If the inputted image is enlarged or reduced, the inputted image is scaled to a multiple of the size of the specified mark. The mark candidate extraction unit 32 extracts figures or marks that satisfy the conditions such as the peripheral shape of the specified mark from the image that has been read in by the image input unit 31. For example, if the specified mark requires that the peripheral shape is circular, one can determine by using the techniques that have been disclosed in Japanese Patent Publications Hei 11-110562 and 2001-331805.

The matching unit 33 uses the polar coordinate image stored in the dictionary 20 and the coordinate conversion table to generate a mark image per rotation angle. The matching unit 33 compares the extracted image to the generated image. The comparison is a simple overlapping comparison method by counting a number of pixels that has a different value at the same location. The above counted value is used to determine the difference. Alternatively, the disclosures in Japanese Patent Publication Hei 5-250475 and Hei 8-235359 are used to determine the matching degree. Furthermore, a predetermined characteristic value is determined per rotational angle, and the characteristic value of the extracted mark is compared against the above characteristic value. In the preferred embodiment, the above simple overlapping comparison is used since the simple overlapping comparison yields a significant accuracy level.

Figure 12:
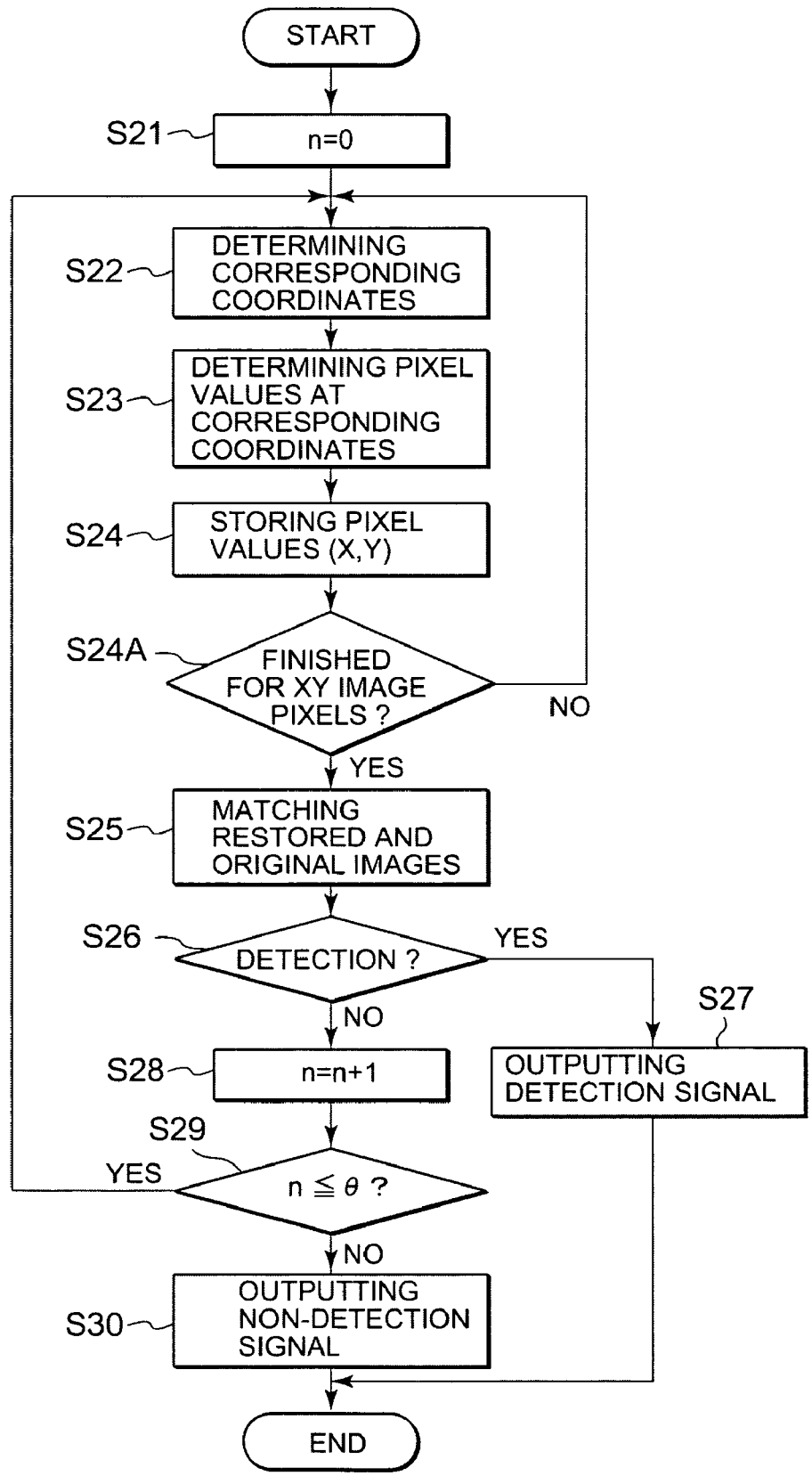
FIG. 12 is a flow chart illustrating steps involved in a preferred process of generating an image per rotational angle from the polar coordinate image by the matching unit 33 according to the current invention.

Now referring to FIG. 12, a flow chart illustrates steps involved in a preferred process of generating an image per rotational angle from the polar coordinate image by the matching unit 33 according to the current invention. In a step S21, a rotational angle counter n for the polar coordinate image is initialized to zero. In the following, the increment of the above counter n means to generate a rotated mark image. In order to generate a specified mark for all of the 40×40 pixels in the extracted images, the following steps S22 through S24 are repeated. In a step S22, for each coordinate (x, y) of the extracted image, the coordinates (F, D) are determined based upon the coordinate conversion table in the dictionary 20. The counter n value of the rotational angle is added to the scale value F. If the coordinate value F of the polar coordinate image exceeds the number of pixels Θ in the rotational direction of the polar coordinate image, the F value is made within a range from 0 to Θ−1. For example, in the coordinate conversion table of FIG. 7, since the polar coordinate (F, D)=(120, 0) corresponds to the coordinate (X, Y)=(20, 19), if n=100, (120+100, 0)=(220−192, 0)=(28, 0). The pixel value of the coordinate (F, D) of the polar coordinate image in the dictionary 20 is extracted in a step S23. The above extracted pixel value is stored as the pixel value at the coordinate (X, Y) in a temporary memory in a step S24. For example, if the counter n is zero, the pixel value at the coordinate (X, Y)=(19, 20) is the pixel value at the coordinate (24, 0) of the polar coordinate image since the corresponding coordinate (F, D)=(24, 0). Similarly, the followings are also true:

The pixel value of at (X, Y)=(20, 20) is that at (72, 0) of the polar coordinate image.

The pixel value of at (X, Y)=(20, 19) is that at (120, 0) of the polar coordinate image.

The pixel value of at (X, Y)=(19, 19) is that at (168, 0) of the polar coordinate image.

In a step S24A, it is determined whether or not all of the pixels have been processed by the steps S22 through S24. If all of the pixels have been processed, the preferred process proceeds to a step S25. Otherwise, the preferred process returns to the step S22.

The generated specified mark image that is temporarily stored in the memory and the extracted image are matched by overlapping in a step S25. The number of pixels having a unmatched pixel value is counted, and the number is compared to a predetermined threshold value in a step S26. If the counted value does not exceed the predetermined threshold value, it is determined that the specified mark is detected as in the YES branch of the step S26, and the corresponding detection signal is outputted for terminating the preferred process in a step S27. The above threshold value is experimentally determined in advance and is stored in the dictionary 20. For example, the threshold value is around 500. On the other hand, if the number of corresponding pixels having a different pixel value exceeds a predetermined threshold value as in the NO branch of the step S26, the rotation angle counter n is incremented by one in a step S28 in order to rotate the specified mark.

If the specified mark has not been rotated for 360 degrees (i.e. n<=Θ) as shown in the YES branch of a step S29, the preferred process returns to the step S22. Furthermore, even if the specified mark has been rotated for 360 degrees (i.e., n>Θ) but has not been matched as shown in the NO branch of a step S29, the preferred process terminates itself by outputting a non-detection signal indicative of not detecting the specified mark in a step S30.

In the first preferred embodiment, if a 40×40 pixel image is used as the specified mark image in a specified mark detection dictionary generation device, the value of D ranges from 0 to 166 while the value of F ranges from 0 to 191. For the above ranges, the matching process is performed by using the 167×192 polar coordinate image for 360 degrees. Because 40×40×192 dictionary images are necessary in another system when 192 rotational images are stored as rotational images for 360 degrees, the above described preferred process substantially reduces the dictionary capacity.

The Second Preferred Embodiment

In the first preferred embodiment, the scale D ranges from 0 to 166 for the image size of 40×40 pixels by applying the same scale D for the same distance r value from the central coordinate of the specified mark dictionary generation image in the polar coordinate conversion table. In the second preferred embodiment, the polar coordinate image is further reduced by clustering the scale D values to make the scale D values smaller. In the second preferred embodiment, the table generation means 11 of the specified mark detection dictionary generation unit 10 of the first preferred embodiment is modified in the following manner while other functions remain substantially the same.

Figure 13:
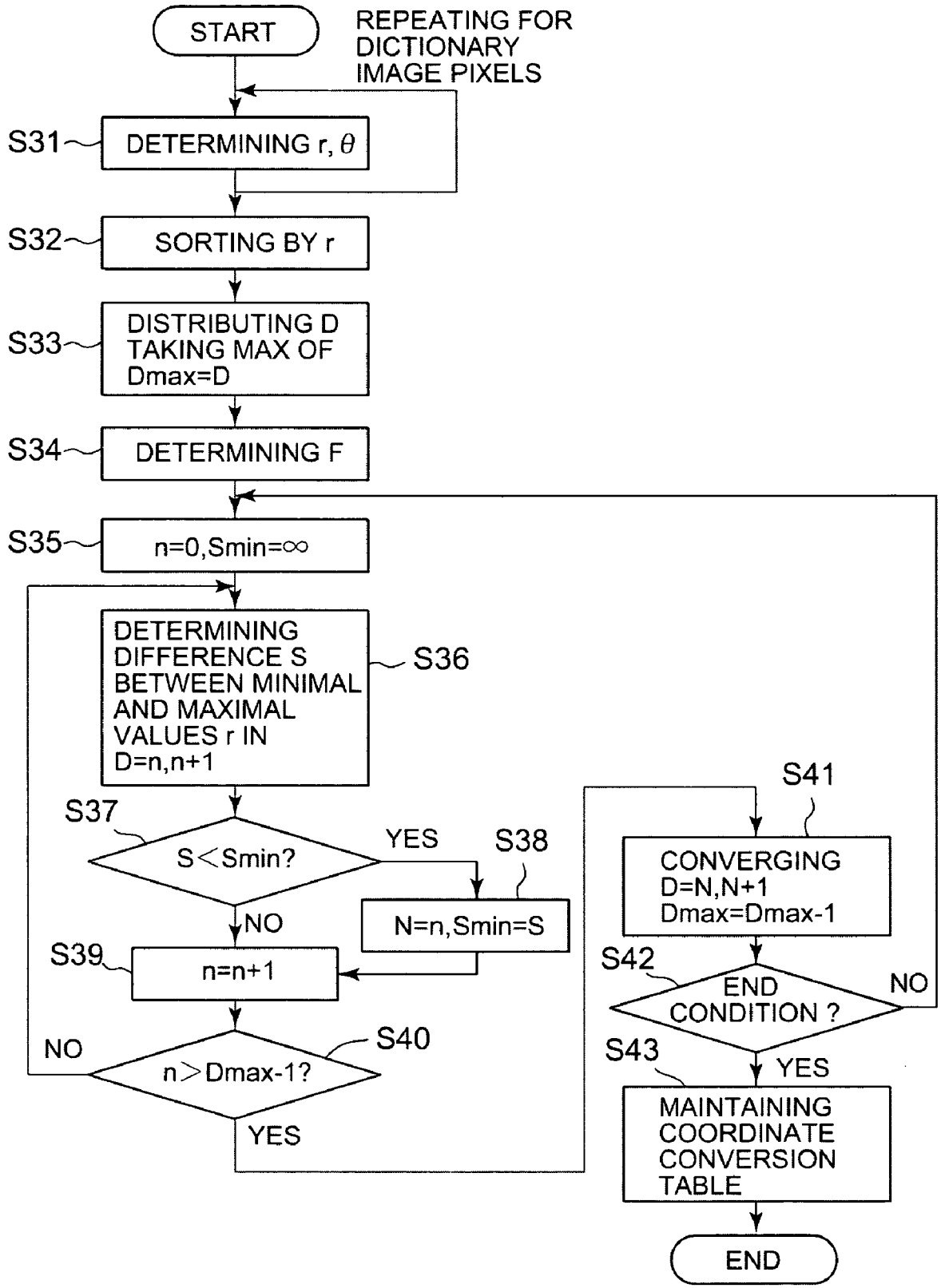
FIG. 13 is a flow chart illustrating steps involved in a second preferred process of generating the polar coordinate conversion table by the coordinate conversion table generation unit according to the current invention.

Now referring to FIG. 13, a flow chart illustrates steps involved in a second preferred process of generating the polar coordinate conversion table. For each pixel in the dictionary generation image of the specified mark, the distance r from the central coordinate and the rotational angle θ from the angular standard line x' are determined in a step S31. In the step S31, a table is generated for the XY coordinates and the corresponding r θ values. Since each pixel is not a point, the distance and the angle are determined based upon the central coordinate and the center of gravity of the pixels as shown in FIG. 4. When the above determination is made for all of the pixels, the table as shown in FIG. 5 is generated for 40×40 pixels. Assuming that the distance r is a first key and the angle θ is a second key, the generated table is sorted by an ascending order in a step S32. In the sorted table, the D scale on the r coordinate in the polar coordinate image is distributed in accordance with the ascending distance r value, and the maximal value of the scale D is stored at a Dmax in a step S33. Based upon the example of FIG. 5, the scale D is distributed as shown in FIG. 6.

The scale F on the θ coordinate in the polar coordinate image is determined in a step S34 based upon the following equations in accordance with the polar coordinate image size, N×Θ, where N is the number of pixels in the r direction and Θ is the number of pixels in the θ direction.

$$U=\pi/\Theta$$

$$F=\theta/U$$

where F is made into an integer by incrementing a fraction to a next integer if the fraction is above or equal to 0.5 otherwise by disregarding the fraction. For example, the above number of pixels Θ in the θ direction is determined by selecting a natural number which the central angle between adjacent pixels at a distance from the central coordinates is U. For a 40×40 pixel image, if Θ=192, the value F is determined as shown in FIG. 7.

Subsequently, for the scale D in the currently generated coordinate conversion table the difference between the maximal and minimal r values is calculated in two adjacent clusters having a D value of 1 in difference in steps S35 through S42. The adjacent cluster having the minimal difference is merged into a single cluster. In the step S35, a class counter n is initialized to an initial value of zero in order to find out if the adjacent scales D in the generated coordinate conversion table belong to the same cluster. In the step S35, a memory location Smin is initialized to a positive infinity value in order to find the minimal difference between the maximal and the minimal r values in the adjacent cluster. In a step S36, the r differential value between the maximal and minimal values of n and (n+1) clusters is determined, and the r differential value is stored in memory S. If a S value is smaller than a Smin value as in the YES branch in a step S37, the cluster counter n value is stored at a memory location N, and the Sim value is replaced by the S value in a step S38 before proceeding to a step S39. On the other hand, if a S value is larger than the Smin value as in the NO branch in the step S37, the preferred process proceeds to the step S39.

In order to find a combination of next adjacent clusters, the cluster counter n is incremented by one in the step S39. If there remains an adjacent pair for processing as in the NO branch in a step S40, the preferred process goes back to the step S36. On the other hand, if there is no adjacent pair remaining as in the YES branch of the step S40, the previously searched cluster N and the cluster (N+1) are integrated into one in a step S41. The integrated cluster D scale value is replaced by the cluster N value, and the scale D is renumbered without any skipping number. The maximal D max of the scale D is decremented by one. When the scale D=0 and the scale D=1 are integrated in FIG. 7, the results are shown in FIG. 14. Lastly, the terminating conditions are checked for the clustering process. If it is completed in the YES branch of a step S42, the generated coordinate conversion table is stored in the dictionary 20 in a step S43. On the other hand, if it is not yet completed as in the NO branch of the step S42, the preferred process returns to the step S35 for further clustering.

One of the following clustering terminating conditions is used in the step S42.

(1) Method of clustering as long as the pixels have the one-to-one correspondence. As clustering is performed as described above, multiple pixels on the XY perpendicular coordinate image indicate a single pixel on the polar coordinate image. In this case, since an error is determined for multiple pixels by a single pixel value on the polar coordinate image, the error calculation precision is clearly lowered. For this reason, in the process of clustering, clustering is terminated when multiple pixels on the XY perpendicular coordinate image indicate a single pixel on the polar coordinate image.

(2) Method of clustering within a range where no significant difference exists between the error in the central angular direction and the maximal and minimal differential r in the same cluster. For example, if 360 degrees are divided into 192, the characteristic value error in the central angular direction is maximal at the pixel (0,0) on the XY perpendicular coordinate farthest from the central coordinate. For this reason, the maximal distance in the error is the distance for 360/193 degrees on the circumference having a diameter of $39\sqrt{2}$ pixels. That is, the distance is 0.451 pixel. $((39\sqrt{2}\times\pi)/192)/2 \approx 0.451$ On the other hand, the characterization value error in the central distance direction is one half of the difference r between the maximal and minimal values in the same class. Before clustering, although the characterization error value in the central distance direction is zero, since the characterization error increases as clustering progresses, the clustering process is completed when the characterization error value in the central distance direction exceed 0.451.

(3) Method of determining a range where the detection performance fails to lower actually performing detection experiments based upon generated polar coordinate image.

Figure 15:
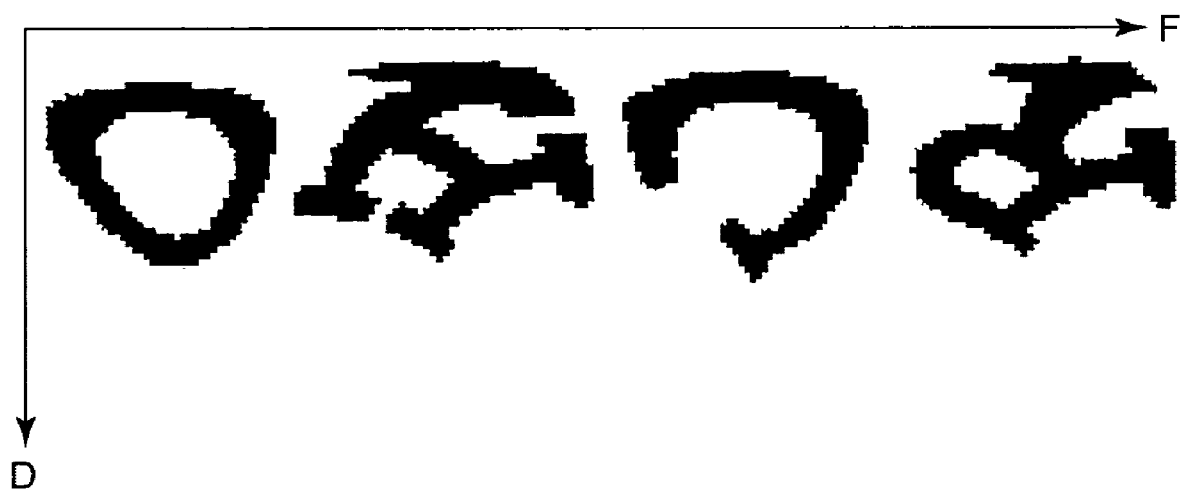
FIG. 15 is an exemplary polar coordinate image as generated from the exemplary specified mark of FIG. 10 based upon the conversion table of FIG. 10 that contains the clustered D scale values.

In the range of the scale D of the coordinate conversion table after clustering on the second preferred embodiment, the scale value is from 0 to 39 in an example of FIG. 14. After the experimental results, the matching performance is not lowered by the above clustering process. For this reason, since the polar coordinate image is 40×193 pixels, the dictionary capacity is substantially reduced in comparison to 192 simply stored rotated images of 40×40 pixels. For example, when a polar coordinate image is generated based upon the coordinate conversion table, the specified mark image of FIG. 10 becomes the polar coordinate image of FIG. 15 as indicated by the FD directions.

Third Preferred Embodiment

In an image input device, various image processes such as edge emphasis are performed. The above image processes are not necessarily performed in the main and sub scanning directions. For example, it is not uncommon to perform the MTF correction only in the main scanning direction. Similarly with the digitization process, it is not necessary to digitize in the equal directions. For this reason, in detecting a specified mark using the above image input device, the techniques as described with respect to the first and second preferred embodiments limit the input image in a certain direction such as a predetermined central angle. If an image is inputted in an opposite direction, it is a concern that error is substantial in detecting a specified mark. In order to reduce the error, in the third preferred embodiment, a plurality of images is prepared by rotating an image in multiple directions for the dictionary generating image. Using the above images, the polar coordinate image is generated.

The third preferred embodiment includes the specified mark detection dictionary generating unit 10 of the first or second preferred embodiments, and only the dictionary generating image input unit 12 or the polar coordinate image generating unit 13 of the specified mark detection dictionary generating unit 10 is modified in the third preferred embodiment in the following manner. Initially, a specified mark image is generated at an equal amount of rotation for the dictionary generation and is stored in a file. The above image is generated by mechanically rotating the image and inputted by a scanner or a similar device. In the alternative, a color image of a particular specified mark is rotated by a computer, and a plurality of rotated color images is generated after substantially similar image processing in the image input device. The dictionary generating image input unit 12 outputs a pixel value at the position that is specified in one of the rotated images in the file by the polar coordinate generating unit 13. In the following, the steps will be described for generating a polar coordinate image after 192 rotated color images are digitized over 360 degrees and are stored in the file. In the alternative, the color image itself is used to generate a polar coordinate image without digitization.

Figure 16:
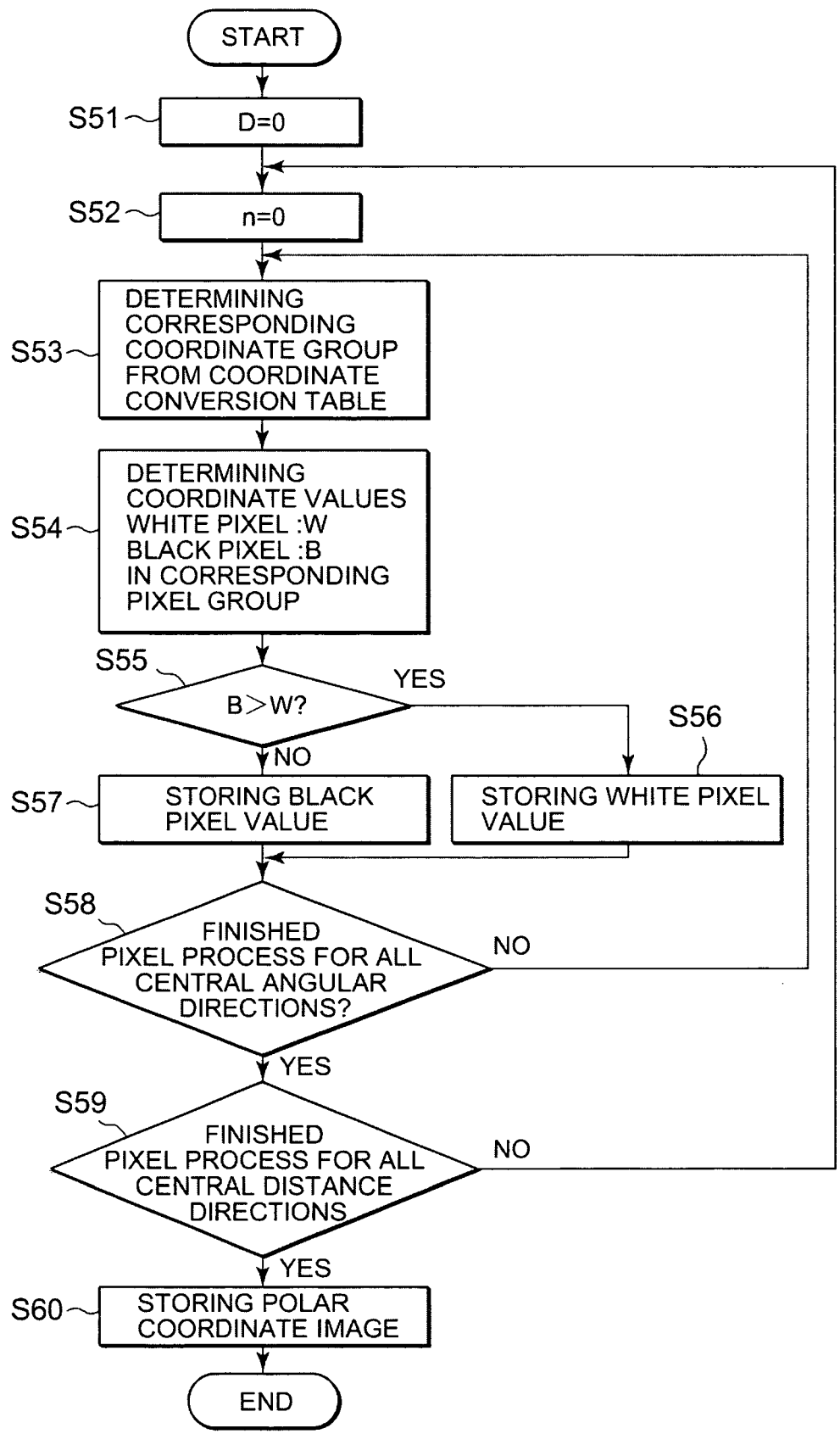
FIG. 16 is a flow chart illustrating steps involved in the process that are performed by the polar coordinate image generating unit 13 in the third preferred embodiment according to the current invention.

Now referring to FIG. 16, a flow chart illustrates steps involved in the process that is performed by the polar coordinate image generating unit 13 in the third preferred embodiment according to the current invention. Initially, in a step S51, the scale D in the central distance direction of the polar coordinate image is initialized to D=0. In a step S52, the rotational counter n for the rotational angle of the polar coordinate image is initialized to n=0. In a step S53, the scale F having the same scale value D in the coordinate conversion table of the dictionary 20 and the coordinates (X,Y) of the specified mark image in the XY perpendicular coordinate corresponding to the polar coordinates (F,D) are extracted. If the coordinate F in the polar coordinate image is equal to or greater than the number of pixels Θ in the rotational angle direction of the polar coordinate image, the F value is within the range from 0 to Θ−1.

For example, if D=0 in the example of the coordinate conversion table of FIG. 7, the F scale values are 24, 72, 120 and 168. That is;

For the coordinates (24, 0) for a polar coordinate image: the coordinates (19,20) of a XY coordinate image.
For the coordinates (72, 0) for a polar coordinate image: the coordinates (20,20) of a XY coordinate image.
For the coordinates (120, 0) for a polar coordinate image: the coordinates (20,19) of a XY coordinate image.
For the coordinates (168, 0) for a polar coordinate image: the coordinates (19,20) of a XY coordinate image.

Figure 18:
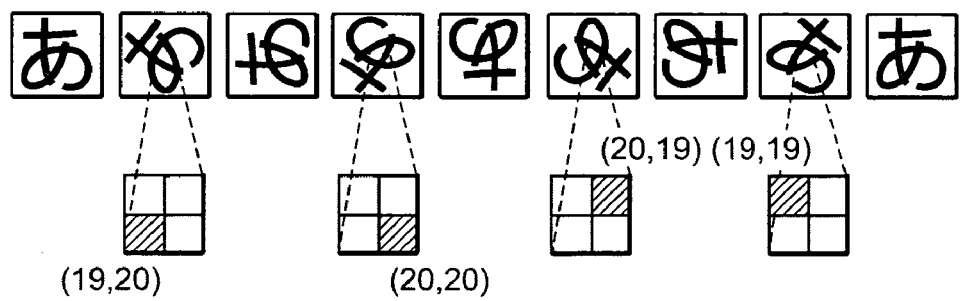
FIG. 18 is a diagram illustrating a second set of exemplary rotated dictionary images that has been rotated by 360/Θ from those of FIG. 17 for determining a pixel value in one polar coordinate image.

In the coordinate conversion table of FIG. 14, if the scale D value is D=0, the F scale values are 24, 72, 120, 168, 10, 38, 58, 86, 106, 134, 154 and 182. Furthermore, in the above example, if the scale D=0 and the counter n=1, the pixel value at coordinates (F+1, 0) of the polar coordinate image is determined at the XY coordinates (19,20); (20,20); (20, 19) and (19,19) respectively in the four rotated images k, where k=24+1, 72+1, 120+1 and 168+1 as shown in FIG. 18.

Figure 17:
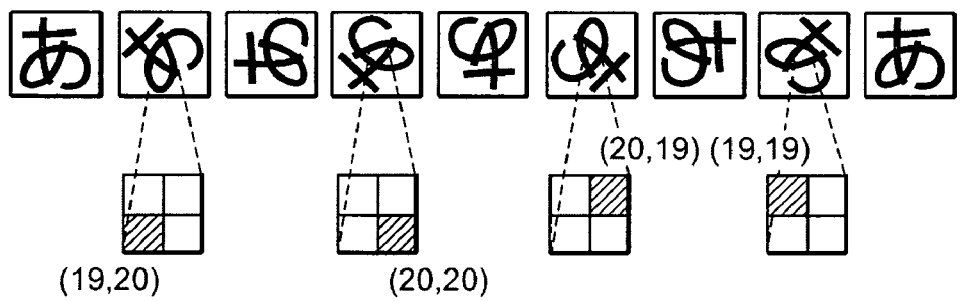
FIG. 17 is diagram illustrating a first set of exemplary rotated dictionary images for determining a pixel value in one polar coordinate image based upon the coordinate conversion table.

Among the rotated images, the pixel values at the XY coordinate image of the rotated images having the above obtained F scale values are extracted by the dictionary generating image input unit 12. The number of white and black pixels among the extracted pixels is stored respectively at the memory W and B in a step S54. For example, if F=24, the pixel value is at the XY image coordinate (19, 20), which is 24th (k=24) among the 192 rotated images as shown in FIG. 17. Similarly, if F=72, the pixel value is at the XY image coordinate (20, 20), which is $72^{nd}$ (k=72) among the rotated images. Others are also similarly extracted.

If the black pixels B exceed the white pixels W in number as the YES branch of a step S55, the pixel value at the coordinate (n, D) in the polar coordinate image is the white pixel value in a Step S56. On the other hand, the black pixels B are equal to or smaller than the white pixels W in number as in the NO branch of the Step S55, the pixel value at the coordinate (n, D) in the polar coordinate image is the black pixel value in a step S57. In a step S58, the counter n is incremented, and the above described steps S53 through S57 are repeated until the pixel value Θ is reached in the rotational angular direction. The increment in the counter n means that the polar coordinate image is rotated by 360/192 degrees. The scale D is incremented by one, the above steps S52 through S58 are repeated until the scale D reaches the maximal value in a step S59. When all of the coordinates (F, D) are finished in the polar coordinate image, the calculated polar coordinate image is stored in the dictionary 20 in a step S60, and the preferred process terminates. The polar coordinate image is generated by referring to a plurality of dictionary generating images that correspond to the input direction in the above described manner. The above reference prevents the detection performance of the specified mark depending upon the original scanning direction. In the above example, the digitized image is used. If a color image is used, instead of using the number of black and white pixels, the pixel values are interpolated.

Fourth Preferred Embodiment

For example, if four pixels in the XY coordinate image have the same D scale value, these four pixels are rotated 90 degrees from each other. In this situation, instead of using the X' axis as in FIG. 2 as the standard line for determining the central angle, the central angle of one of the four pixels is used as the standard. When the number of pixels Θ is a multiple of four, the characteristic value error in the central angular direction becomes zero. In the fourth preferred embodiment, among pixels having the same scale value D, the central angle of one of these pixels is used as the standard to determine the central angle of other pixels so that the characterization value error in the central angular direction is reduced. In the fourth preferred embodiment, the specified mark detection dictionary generation unit 10 of the previously described preferred embodiments is altered in the following manner. The specified mark detection unit 30 is substantially identical and will not be described. The coordinate conversion table generating unit 11 generates the pixel coordinates in the XY perpendicular coordinate system of the dictionary generation image and the coordinate conversion table indicating the correspondence to the pixels in the r θ polar coordinate system. The coordinate conversion table generating unit 11 stores the above generated information in the dictionary 20.

Figure 19:
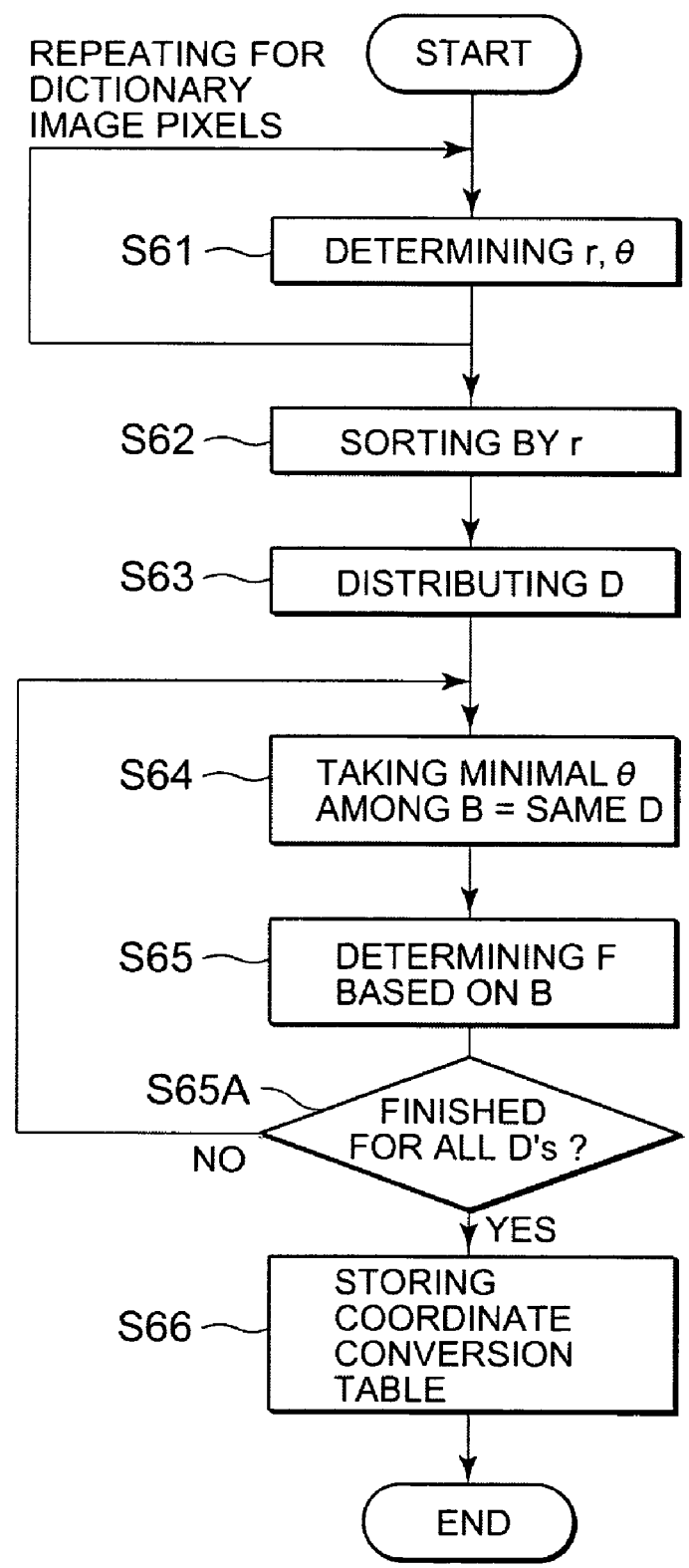
FIG. 19 is a flow chart illustrates steps involved in a preferred process of generating the coordinate conversion table by the coordinate conversion table generation unit based upon a standard central angle of the selected pixel having the same D scale value according to the current invention.

Now referring to FIG. 19, a flow chart illustrates steps involved in a preferred process of the coordinate conversion table according to the current invention. In a step S61, for each pixel in the specified mark dictionary generating image, the distance r from the center and the rotational angle θ from the angular standard line X' are determined. In the step S61, a list is generated for the pixel coordinate (x, y) in the XY perpendicular coordinate and the corresponding distance r and angle θ values. Since each pixel is not a point, its distance and angle are determined based upon the central coordinate and the center of gravity for all of the pixels. Thus, the list as shown in FIG. 5 is generated. According to the distance r as the first key and the angle as the second key, the generated list is sorted in the ascending order in a step S62. In the sorted list, the scale D value is distributed from 0, and the scale D in the above example is distributed as shown in FIG. 6 in a step S63.

For all of the above scale D values, the scale F is determined by repeating steps S64 and S65. For the pixels having the same scale D value, the pixel having the least θ is sought in a step S64, and the above θ value is used as a standard angle B. For the pixels with the same scale D value, the scale F on the θ coordinate in the polar coordinate image is determined according to the polar coordinate image size based upon the following equation in a step S65. The polar coordinate image size is N×Θ, where the number of pixels is N in the r direction and the number of pixels is Θ in the θ direction.

$$U = 2\pi/\Theta$$

$$F = (\theta - B) - U$$

where F is made into an integer by incrementing a fraction equal to or above 0.5 and by disregarding the rest. For example, the number of pixels Θ in the θ direction is selected by an integer so that U becomes the central angle between adjacent pixels at a distance from the central coordinate. If the image is 40×40 and Θ=192, the F value is determined as shown in FIG. 20. In a step S66, the generated coordinate conversion table is stored in the dictionary 20, and the process terminates. The data structure of the generated coordinate conversion table is the same as that in the first preferred embodiment.

Figure 21:
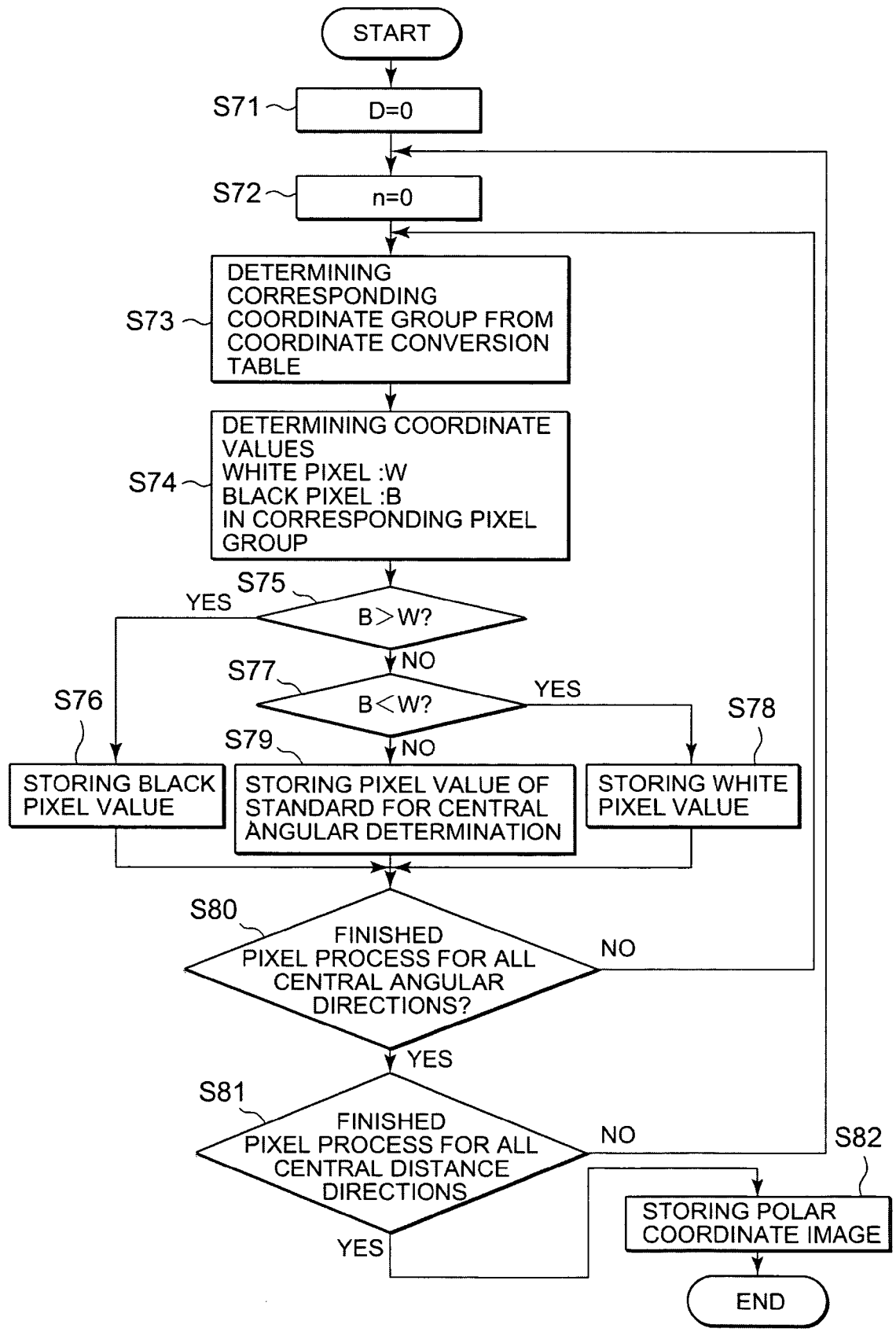
FIG. 21 is a flow chart illustrating the steps involved in changing the standard for the central angle determination by changing the steps of the polar coordinate image generating unit 13 in generating the polar coordinate image.

If the standard is changed for the central angle determination as described above, the detection performance has been experimentally confirmed for improvement by changing the steps by the polar coordinate image generating unit 13 in generating the polar coordinate image to those shown in a flow chart of FIG. 21. The following will be described for the situation where the 192 digital dictionary generating images are prepared as the third preferred embodiment. In a step S71, the scale D value in the central direction of the polar coordinate image is initialized to zero. In a step S72, the counter n for the rotational angle in the polar coordinate image is initialized to zero. The scale F having the same scale D value in the coordinate conversion table in the dictionary 20 and the corresponding coordinates (X, Y) of the specified mark in the XY perpendicular coordinate are extracted in a step S73. The rotational angle counter n value is added to the above F scale in the step S73. If the coordinate F in the polar coordinate image is equal to or more than the number of pixels Θ in the rotational angular direction in the polar coordinate image, the F value ranges from 0 to Θ−1. For the example of the coordinate conversion table in FIG. 20, if D=0, the scale F has four points including 0, 48, 96, and 144. That is, The polar coordinate image (0, 0): The XY coordinate image (19, 20)

The polar coordinate image (48,0): The XY coordinate image (20, 20)

The polar coordinate image (96,0): The XY coordinate image (20, 19)

The polar coordinate image (144,0): The XY coordinate image (19, 19)

Figure 23:
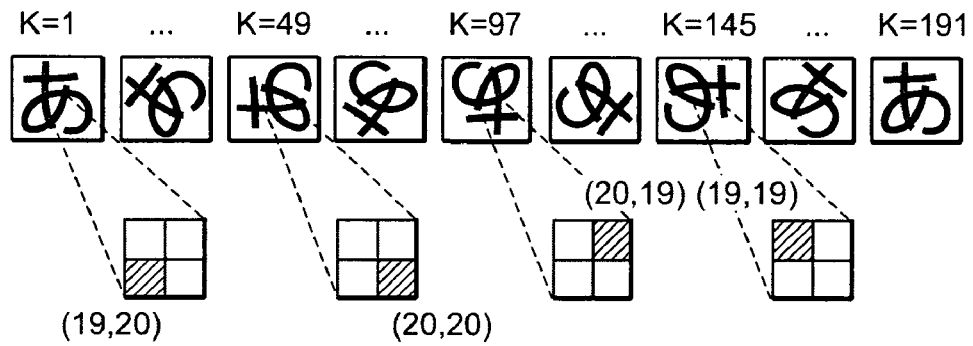
FIG. 23 is diagram illustrating a fourth set of exemplary rotated dictionary images that has been rotated by 360/Θ from those of FIG. 22 for determining a pixel value in one polar coordinate image.

In the above example, if the scale D=0 and the counter n=1, the pixel values at the polar coordinate image (F+1,0) are the pixel values at the XY coordinate image (19, 20), (20, 20), (19, 19) respectively for the four rotational images at K=0+1, 48+1, 96+1 and 144+1 a shown in FIG. 23.

Figure 22:
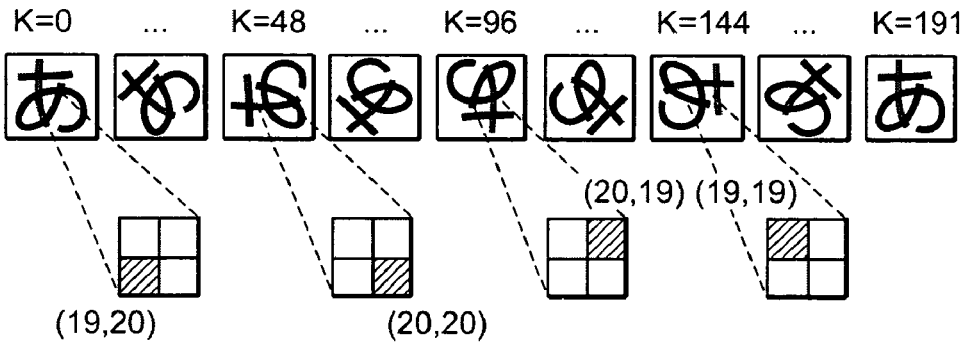
FIG. 22 is diagram illustrating a third set of exemplary rotated dictionary images for determining a pixel value in one polar coordinate image.

Subsequently, among the rotational images having the same amount of rotation as the F scale value, the pixel values at the extracted XY coordinate image (X, Y) are determined for the dictionary generating image input unit 12 in a step S74. Among the extracted pixels, the number of white pixels is stored in the memory W while the number of black pixels is stored in the memory B in a step S74. For example, if F=0, the pixel value at the coordinate (19, 20) in the XY coordinate image is extracted for the $0^{th}$ (k=0) image among the 192 rotational images as shown in FIG. 22. If F=48, the pixel value at the XY coordinate image (20, 20) is extracted for the $48^{th}$ (k=48) image. Similarly, other pixel values are taken. If the number of the black pixels (B) exceeds that of the white pixels as in the YES branch of a step S75, the pixel value at the polar coordinate image (n, D) is replaced by the black pixel value in a step S76. On the other hand, if the number of black pixels (B) is smaller than that of the white pixels (W) as in the YES branch of a step S77, the pixel value at the polar coordinate image (n, D) is replaced by the white pixel value in a step S78. Furthermore, if the number of white (W) and black (B) pixels is the same as in the NO branch of a step S77, the pixel value at the polar coordinate image (n, D) is replaced by the pixel value of the standard pixel for determining the central angle in a step S79. The above steps S73 through S79 will be repeated until the counter n reaches the pixel value Θ in the rotational angular direction after the counter n is incremented in a step S80. The incrementing the counter n by one is to rotate the polar coordinate image by 360/192 degrees. In a step S81, the above steps S72 through S80 are repeated until the scale D reaches the maximal value after the scale D is incremented by one at a time in a step S81. After the determination is complete for all of the coordinates (F, D) in the polar coordinate image, the generated polar coordinate image is stored in the dictionary 20 in a step S82, and the process terminates itself. In the above, although the process is described for a digital image, for a color image, the pixel values are interpolated rather than the number of black or white pixels.

Figure 24:
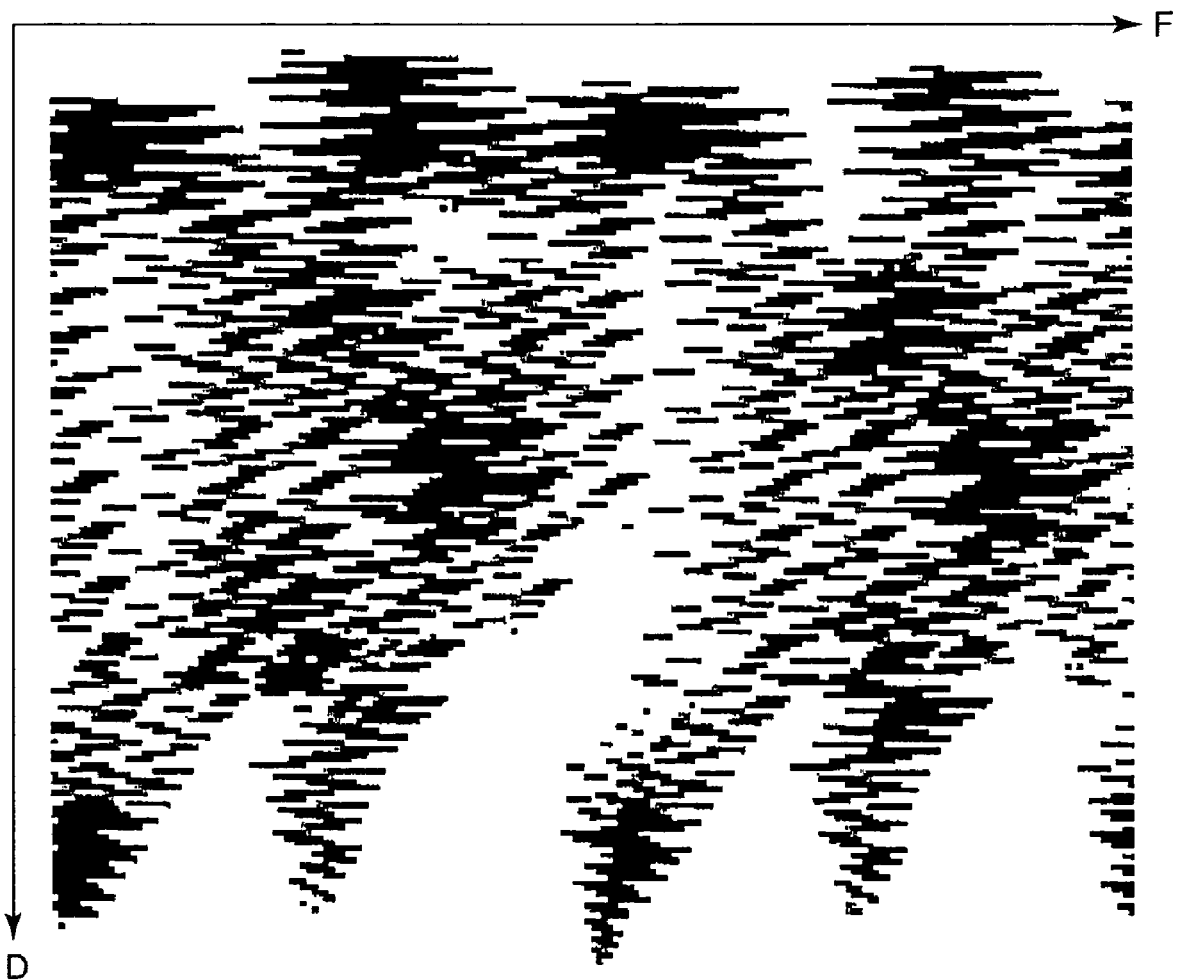
FIG. 24 is an exemplary polar coordinate image generated from the specified mark image of FIG. 10 based upon the coordinate conversion table for which the standard has been changed.
Figure 25:
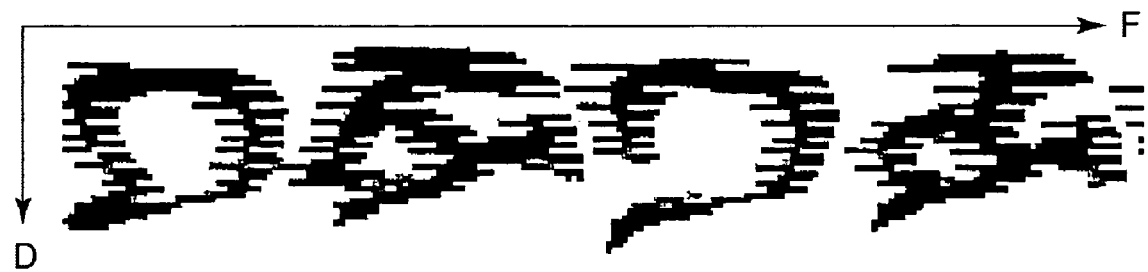
FIG. 25 is an exemplary polar coordinate image generated from the specified mark image of FIG. 10 based upon the coordinate conversion table for which the standard has been changed and whose scale values have been clustered.

The polar coordinate image is generated based upon the coordinate conversion table of the fourth preferred embodiment. For example, the specified mark image of FIG. 10 becomes the polar coordinate image of FIG. 24 as indicated by the FD directions. If the clustering process of the second preferred embodiment is performed on the coordinate conversion table of the fourth preferred embodiment, the specified mark image of FIG. 10 becomes the polar coordinate image of FIG. 25 as indicated by the FD directions. In FIG. 24 or 25, since the standard is different for each scale D in determining the central angle, the image is observed to have a shift for each scale D in the central angular direction in comparison to FIGS. 11 and 15.

Fifth Preferred Embodiment

The matching unit 33 of the specified mark detection unit 30 in the above preferred embodiments performs the matching process after the whole XY coordinate image is reconstructed from the polar coordinate image. In the fifth preferred embodiment, the matching process is performed by a simple overlap without reconstructing the entire XY coordinate image. In the fifth preferred embodiment, the functions of the image input unit 31 and the specified mark candidate extraction unit 32 of the specified mark detection unit 30 as well as the specified mark detection dictionary generating unit 10 are substantially identical to those of the above described preferred embodiments. The corresponding description will not be repeated.

Figure 26:
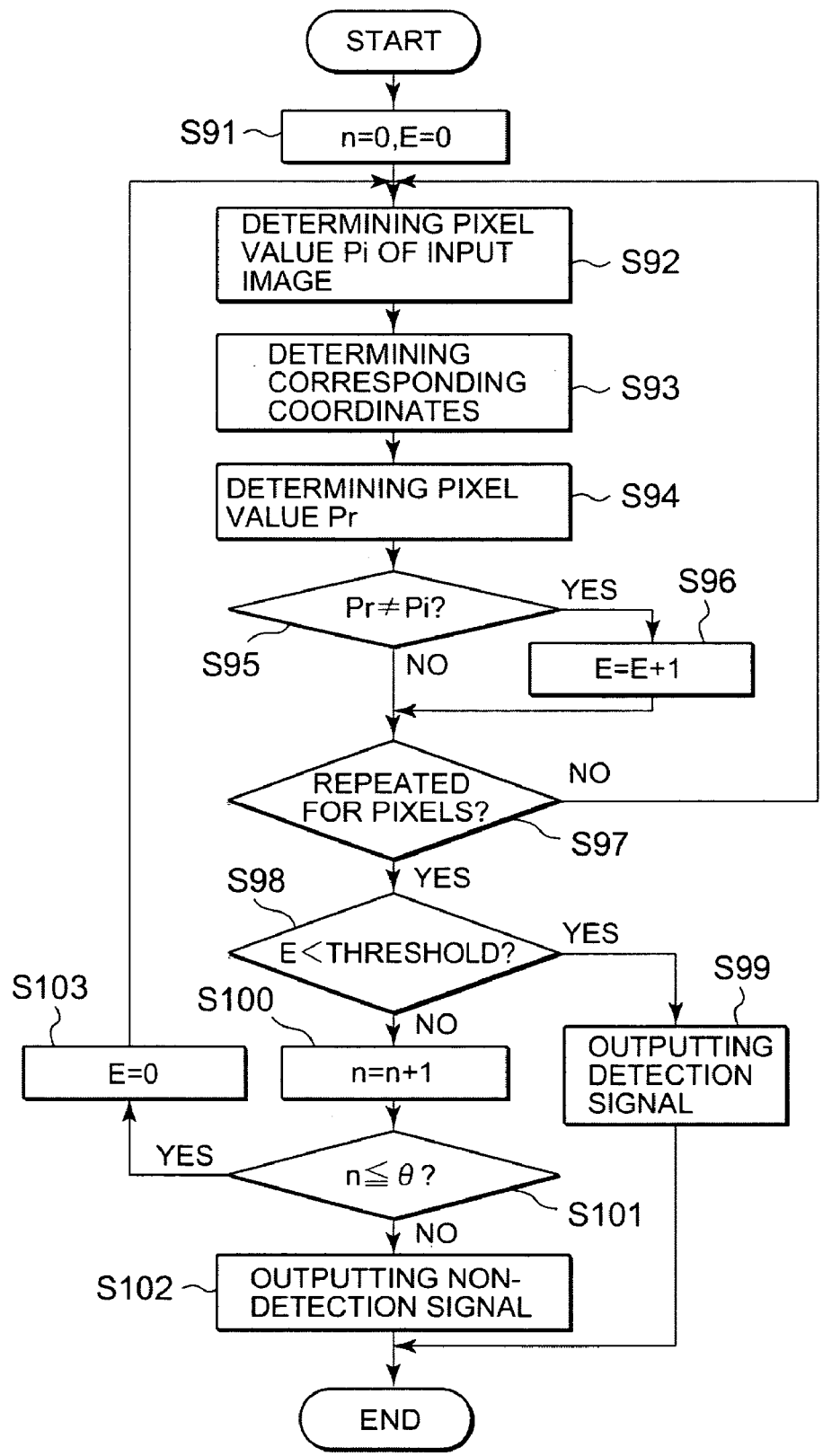
FIG. 26 is a flow chart illustrating steps involved in a preferred process of matching by the matching unit 33 without reconstructing the entire XY coordinate image according to the fifth preferred embodiment of the current invention.

Now referring to FIG. 26, a flow chart illustrates steps involved in a preferred process of matching by the matching unit 33 according to the fifth preferred embodiment. In a step S91, the rotational angle counter n for the specified mark image and the unmatched pixel counter E are both initialized to zero in a step S91. The pixel value is taken in a step S92 at the single coordinate (X, Y) among the specified mark candidate images that have been taken out by the mark candidate extraction unit 32. The above pixel value is assigned to Pi. The polar coordinate image at (F, D) is determined for the coordinate (X, Y) based upon the coordinate conversion table in the dictionary 20 in a step S93. The counter n value is added to the above scale F value in a step S93. If the coordinate F in the polar coordinate image exceeds the number of the pixels Θ in the rotational direction in the polar coordinate image, the F value ranges from 0 to Θ−1. For example, in the coordinate conversion table of FIG. 7, since the coordinates (X, Y)=(20, 19) correspond to the polar coordinates (F, D)=(20, 0), if n=100, (120+100, 0)=(220−192, 0)=(28, 0). For the above reasons, the corresponding pixel values in the specified mark image for the coordinate (X, Y)=(20, 19) are those at the polar coordinate image (28, 0). In a step S94, the pixel values at the above obtained polar coordinate image (F, D) are extracted and are assigned to Pr. In the same example, in the coordinate conversion table of FIG. 7, the coordinates (X, Y)=(18, 19) correspond to the polar coordinate image at (F, D)=(182, 1). The pixel values at the XY coordinate image (18, 19) become the pixel values at the polar coordinate image (182, 1).

The specified mark candidate image pixel value Pi and the specified mark image pixel value Pr are compared in a step S95. If they are different as in the YES branch of the step S95, the unmatched pixel counter E is incremented by one in a step S96. If the preferred process has not been completed for all of the pixels in the specified mark candidate image as in the NO branch of a step S97, the preferred process returns to the step S92. On the other hand, upon completing the process on all of the pixels in the specified mark candidate image as in the YES branch of the step S97, if the unmatched pixel number counter E has not exceeded a predetermined threshold value as in the YES branch of a step S98, it is determined that the specified mark has been detected and the process is terminated by outputting a detection signal in a step S99. The above threshold value has been experimentally determined. On the other hand, if the unmatched pixel number counter E has exceeded the predetermined threshold as in the NO branch of the step S98, the specified mark rotational counter n is incremented by one in a step S100. If the counter n value has exceeded the pixel value Θ in the rotational angular direction of the polar coordinate images as in the NO branch of a step S101, it is determined that the extracted specified mark candidate image is not the specified mark. The preferred process terminates by outputting a non-detection signal in a step S102. On the other hand, the counter n value is equal to or has not exceeded the number of pixels Θ in the rotational direction of the polar coordinate images in the YES branch of the step S101, the unmatched pixel number counter E is initialized to zero, and the preferred process returns to the step S92. As described above, since error is determined for each pixel, there is no need for reconstructing the XY whole image. The memory capacity necessary for matching is substantially reduced.

Sixth Preferred Embodiment

The current invention is carried out by a software program stored in a computer memory or a memory device. The functions of the above described preferred embodiments of the specified mark recognition device are implemented by a software program. Alternatively, the functions of the specified mark detection dictionary generating device or the specified mark detection device are both implemented by a software program. The above implemented software programs are stored in a recording medium such as CD-ROM, and the CD-ROM is placed in a drive device such as a CD-ROM drive for reading the program into a computer memory or another memory and for executing it.

The software itself read that is from the recording medium implements the functions of the above described preferred embodiments. Furthermore, the program or the recording medium containing the program are also within the scope of the invention. The recording media include a semiconductor media such as ROM and non-volatile memory cards, optical media such as DVD, MO, MD and CD-R as well as magnetic media such as magnetic tapes and floppy disks. By executing the loaded program, not only the functions of the above described preferred embodiments are implemented, but also a part or a whole of the process is performed by the operating system based upon the instructions from the program. The process may also implement the functions of the preferred embodiments. The above program is stored in a memory device such as a magnetic disk of a server computer, and the program is distributed by downloading among the users who are connected via a network such as the Internet. The memory device of the server computer is also within a scope of the current invention.

Seventh Preferred Embodiment

Figure 27:
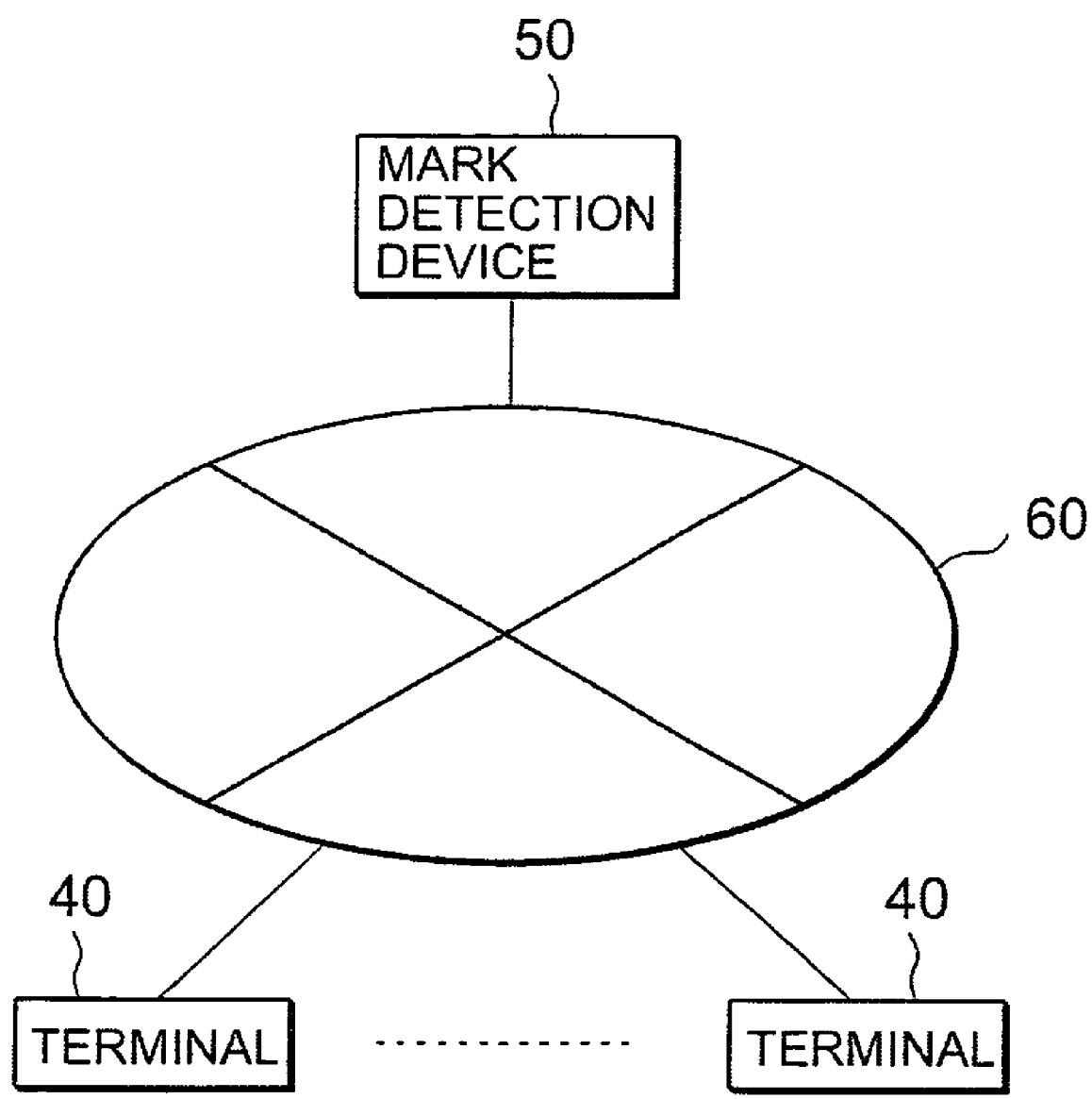
FIG. 27 is a diagram illustrating a seventh preferred embodiment that operates with the network connection according to the current invention.

Now referring to FIG. 27, a diagram illustrates a seventh preferred embodiment that operates with the network connection according to the current invention. That is, the users use the terminals 40 to transmit the specified mark detection image to the specified mark detection unit 50 according to the current invention that is connected via the network 60. The users subsequently receive the detection results and output the results. The specified mark detection unit 50 includes the dictionary that has been generated by the specified mark detection dictionary generating unit according to the current invention. Specified mark candidates are extracted from the images received from the user terminals 40. After matching with the dictionary, the results are returned to the terminals 40. By the above, the detection service is performed to determine whether or not a specified mark exists in the image that the user possesses. Each unit of the current invention is used in the following manner. Firstly, the user generates a dictionary for own use by the specified mark detection dictionary generating device according to the current invention. Secondly, the specified mark detection software program without a dictionary is down loaded to the user terminal 40 via the network from the server computer. The specified mark is being detected by the above detection software program or an application program including the above detection software program along with the previously generated own dictionary. Thus, the most recent specified mark detection program is always advantageously available for use.

Eighth Preferred Embodiment

The above described invention for detecting the specified mark is implemented by a circuit. For example, to detect a printed or etched specified mark on the surface, a plurality of the specified mark dictionaries is necessary. The specified marks include bank marks printed on currency of each country and the designs on various coin surfaces. The electronic circuit having the function to detect the specified mark is placed in a copier or a sorting machine in order to prevent the duplication of paper currency or to apply to the sorting task at a factory or in a distribution process. In the above case, the matching means of the specified mark detection device for detecting the specified mark is implemented on a electronic circuit. For each of the electric circuits, a dictionary is provided, and the electric circuit is operated. Based upon the detection or non-detection signal, it is determined whether or not a specified mark has been matched to generate a final detection signal.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating a dictionary for detecting a specified mark, comprising the steps of:
    inputting a dictionary image;
    generating a coordinate conversion table containing a list of corresponding coordinates between a predetermined XY coordinate and a predetermined polar coordinate for converting the inputted dictionary image into polar coordinates, the polar coordinates being expressed by a central distance to a predetermined center and a central angle, the coordinate conversion table further including a pair of F and D values corresponding to the XY coordinate, the F value being an integer by counting fractions equal to or over 0.5 as defined in an equation $F=\theta/U$, where $U=2\pi/\Theta$, the $\theta$ being the central angle in the polar coordinates, the $\Theta$ being a number of pixels in a $\Theta$ direction, the D value being assigned an integer from 0 to a predetermined number for the central distance in the polar coordinates;
    generating a polar coordinate image for the dictionary from the dictionary image based upon the coordinate conversion table;
    storing the coordinate conversion table and the polar coordinate image in the dictionary;
    rotating to reconstruct an image based upon the coordinate conversion table; and
    comparing the reconstructed image and specified mark candidates to determine the specified mark to identify a match.

2. The method of generating a dictionary according to claim 1 wherein the dictionary image contains pixels, the central distance being in a central direction scale indicative of a distance between a center of each of the pixels and a center of the dictionary image in the predetermined XY coordinate, and the central angle being in a central rotation direction scale indicative of a degree of rotation of the dictionary image.

3. The method of generating a dictionary according to claim 2 wherein the central distance being clustered into clusters, each of the clusters in the central direction being expressed by the polar coordinate.

4. The method of generating a dictionary according to claim 3 wherein the clustering is performed based upon the central direction scale so that correspondence is one-to-one between the pixels between the dictionary image and the polar coordinate image as expressed in the polar coordinate.

5. The method of generating a dictionary according to claim 3 wherein the clustering is performed based upon the central direction scale so that a substantial difference is prevented in characteristics value between the central direction scale and the central rotation direction scale.

6. The method of generating a dictionary according to claim 2 wherein a rotated image is being rotated based upon the central angle, pixels having the same central direction scale being extracted from the rotated image, pixel values in the polar coordinate being determined based upon the extracted pixels.

7. The method of generating a dictionary according to claim 2 wherein one of the pixels having the same distance in the central direction is selected, the central angle of the selected pixel being used as a standard, the central rotation direction scale of other pixels having the same distance in the central direction being set to the central rotation direction scale of the standard.

8. The method of generating a dictionary according to claim 7 wherein a rotated image is being rotated based upon the central angle of the standard, pixels having the same central direction scale being extracted from the rotated image, in determining pixel values in the polar coordinate based upon the extracted pixels, a weight value being made large for a pixel value of the standard.

9. The method of generating a dictionary according to claim 8 further comprising the additional step of:
    comparing pixels between the reconstructed image and specified mark candidates to determine the specified mark.

10. A storage medium for storing a computer program containing instructions for generating a dictionary and for detecting a specified mark, the instructions comprising the tasks of:
    inputting a dictionary image;
    generating a coordinate conversion table containing a list of corresponding coordinates between a predetermined XY coordinate and a predetermined polar coordinate for converting the inputted dictionary image into polar coordinates, the polar coordinates being expressed by a central distance to a predetermined center and a central angle, the coordinate conversion table further including a pair of F and D values corresponding to the XY coordinate, the F value being an integer by counting fractions equal to or over 0.5 as defined in an equation $F=\Theta/U$, where $U=2\pi/\Theta$, the $\theta$ being the central angle in the polar coordinates, the $\Theta$ being a number of pixels in a $\Theta$ direction, the D value being assigned an integer from 0 to a predetermined number for the central distance in the polar coordinates;
    generating a polar coordinate image for the dictionary from the dictionary image based upon the coordinate conversion table;
    storing the coordinate conversion table and the polar coordinate image in the dictionary;
    rotating to reconstruct an image based upon the coordinate conversion table; and
    comparing the reconstructed image and specified mark candidates to determine the specified mark to identify a match.

11. The storage medium for storing a computer program containing instructions according to claim 10 wherein the dictionary image contains pixels, the central distance being in a central direction scale indicative of a distance between a center of each of the pixels and a center of the dictionary image in the predetermined XY coordinate, and the central angle being in a central rotation direction scale indicative of a degree of rotation of the dictionary image.

12. The storage medium for storing a computer program containing instructions according to claim 11 wherein one of the pixels having the same distance in the central direction is selected, the central angle of the selected pixel being used as a standard, the central rotation direction scale of other pixels having the same distance in the central direction being set to the central rotation direction scale of the standard.

13. The storage medium for storing a computer program containing instructions according to claim 12 wherein a rotated image is being rotated based upon the central angle of the standard, pixels having the same central direction scale being extracted from the rotated image, in determining pixel values in the polar coordinate based upon the extracted pixels, the central angle of the standard, a weight value being made large for a pixel value of the standard.

14. The storage medium for storing a computer program containing instructions according to claim 13 further comprising an additional task of:
    comparing pixels between the reconstructed image and specified mark candidates to determine the specified mark.

15. An apparatus for generating a dictionary for detecting a specified mark, comprising:
    a dictionary generation image input unit for inputting a dictionary image;
    a coordinate conversion table generation unit for generating a coordinate conversion table containing a list of corresponding coordinates between a predetermined XY coordinate and a predetermined polar coordinate for converting the inputted dictionary image into polar coordinates, the polar coordinates being expressed by a central distance to a predetermined center and a central angle, the coordinate conversion table further including a pair of F and D values corresponding to the XY coordinate, the F value being an integer by counting fractions equal to or over 0.5 as defined in an equation $F=\theta/U$, where $U=2\pi/\Theta$, the $\theta$ being the central angle in the polar coordinates, the $\Theta$ being a number of pixels in a $\theta$ direction, the D value being assigned an integer from 0 to predetermined number for the central distance in the polar coordinates;
    a polar coordinate generation unit connected to said dictionary generation image input unit and said coordinate conversion table generation unit for generating a polar coordinate image for the dictionary from the dictionary image based upon the coordinate conversion table;
    a dictionary connected to said polar coordinate generation unit for storing the coordinate conversion table and the polar coordinate image;
    an image input unit for inputting an image;
    a mark candidate extraction unit connected to said image input unit for extracting specified mark candidates from the inputted image; and
    a matching unit connected to said dictionary and said mark candidate extraction unit for rotating to reconstruct an image based upon the coordinate conversion table, said matching unit comparing the reconstructed image and the specified mark candidates to determine a specified mark to identify a match.

16. The apparatus for generating a dictionary according to claim 15 wherein the dictionary image contains pixels, said polar coordinate generation unit determining the central distance in a central direction scale indicative of a distance between a center of each of the pixels and a center of the dictionary image in the predetermined XY coordinate, said polar coordinate generation unit also determining the central angle in a central rotation direction scale indicative of a degree of rotation of the dictionary image.

17. The apparatus for generating a dictionary according to claim 16 wherein said polar coordinate generation unit groups the central distance into clusters, each of the clusters in the central direction being expressed by the polar coordinate.

18. The apparatus for generating a dictionary according to claim 17 wherein the clustering is performed based upon the central direction scale so that correspondence is one-to-one between the pixels between the dictionary image and the polar coordinate image as expressed in the polar coordinate.

19. The apparatus for generating a dictionary according to claim 17 wherein the clustering is performed based upon the central direction scale so that a substantial difference is prevented in characteristics value between the central direction scale and the central rotation direction scale.

20. The apparatus for generating a dictionary according to claim 17 wherein a rotated image is being rotated based upon the central angle, pixels having the same central direction scale being extracted from the rotated image, pixel values in the polar coordinate being determined based upon the extracted pixels.

21. The apparatus for generating a dictionary according to claim 17 wherein one of the pixels having the same distance in the central direction is selected, the central angle of the selected pixel being used as a standard, the central rotation direction scale of other pixels having the same distance in the central direction being set to the central rotation direction scale of the standard.

22. The apparatus for generating a dictionary according to claim 21 wherein a rotated image is being rotated based upon the central angle of the standard, pixels having the same central direction scale being extracted from the rotated image, in determining pixel values in the polar coordinate based upon the extracted pixels, a weight value being made large for a pixel value of the standard.

23. The apparatus for generating a dictionary according to claim 22 wherein said matching unit compares pixels between the reconstructed image and specified mark candidates to determine the specified mark.

24. An apparatus for generating a dictionary for detecting a specified mark, comprising:
    a dictionary generation image input unit for inputting a specified mark image;
    a polar coordinate generation unit connected to said dictionary generation image input unit for generating a polar coordinate image from the specified mark image based upon a predetermined coordinate conversion table, the specified mark in a polar coordinate image being expressed by a central distance to a predetermined center and a central angle, the coordinate conversion table further including a pair of F and D values corresponding to the XY coordinate, the F value being an integer by counting fractions equal to or over 0.5 as defined in an equation $F=\theta/U$, where $U=2\pi/\Theta$, the $\theta$ being the central angle in the polar coordinates, the $\Theta$ being a number of pixels in a $\theta$ direction, the D value being assigned an integer from 0 to a predetermined number for the central distance in the polar coordinates;
    a dictionary unit connected to said polar coordinate generation unit for storing the polar coordinate image; and
    a matching unit connected to said dictionary unit for rotating the polar coordinate image based upon the coordinate conversion table to reconstruct a rotated reconstructed polar coordinate image, said matching unit comparing the rotated reconstructed polar coordinate image and specified mark candidates to determine the specified mark to identify a match.

25. An apparatus for generating a dictionary for detecting a specified mark, comprising:
- a dictionary generation image input unit for inputting a specified mark image;
- a polar coordinate generation unit connected to said dictionary generation image input unit for generating a polar coordinate image from the specified mark image based upon a predetermined coordinate conversion table, the specified mark in a polar coordinate image being expressed by a central distance to a predetermined center and a central angle, the coordinate conversion table further including a pair of F and D values corresponding to the XY coordinate, the F value being an integer by counting fractions equal to or over 0.5 as defined in an equation $F=\theta/U$, where $U=2\pi/\Theta$, the $\theta$ being the central angle in the polar coordinates the $\Theta$ being a number of pixels in a $\theta$ direction the D value being assigned an integer from 0 to a predetermined number for the central distance in the polar coordinates;
- a dictionary unit connected to said polar coordinate generation unit for storing the polar coordinate image; and
- a matching unit connected to said dictionary unit for rotating the polar coordinate image based upon the coordinate conversion table to reconstruct a rotated reconstructed polar coordinate image, said matching unit comparing pixels in the rotated reconstructed polar coordinate image and corresponding pixels in specified mark candidates to determine the specified mark to identify a match.

* * * * *